(12) United States Patent
Bengea et al.

(10) Patent No.: US 8,678,033 B2
(45) Date of Patent: Mar. 25, 2014

(54) PROPORTIONAL VALVE EMPLOYING SIMULTANEOUS AND HYBRID ACTUATION

(75) Inventors: Sorin C. Bengea, Auburn, MA (US); G. Clark Fortune, Farmington Hills, MI (US); Thomas J. Stoltz, Allen Park, MI (US); Benjamin Saltsman, Bloomfield Township, MI (US); Mihai Dorobantu, Eden Prairie, MN (US); Subbaraya Radhamohan, Austin, TX (US); Qinghui Yuan, Maple Grove, MN (US)

(73) Assignee: Eaton Corporation, Cleveland, OH (US)

( * ) Notice: Subject to any disclaimer, the term of this patent is extended or adjusted under 35 U.S.C. 154(b) by 564 days.

(21) Appl. No.: 12/731,002

(22) Filed: Mar. 24, 2010

(65) Prior Publication Data
US 2011/0232791 A1 Sep. 29, 2011

(51) Int. Cl.
| F16K 31/06 | (2006.01) |
| F16K 31/122 | (2006.01) |
| F16K 3/32 | (2006.01) |
| F16K 11/07 | (2006.01) |

(52) U.S. Cl.
USPC ............ 137/614.17; 137/625.64; 137/625.65; 137/625.66; 251/14; 251/129.03

(58) Field of Classification Search
USPC ............ 137/614.17, 596.15, 596.17, 596.18, 137/625.64, 625.65, 625.66; 251/14, 251/129.03
See application file for complete search history.

(56) References Cited

U.S. PATENT DOCUMENTS

| 1,143,230 | A | * | 6/1915 | Root | 137/614.16 |
| 1,230,150 | A | * | 6/1917 | Geraghty | 251/14 |
| 1,387,073 | A | * | 8/1921 | Reilley | 137/614.16 |
| 1,406,333 | A | * | 2/1922 | Beach | 251/129.03 |
| 2,089,873 | A | * | 8/1937 | Benson | 137/614.16 |
| 3,482,486 | A | * | 12/1969 | Nordholm, Jr. | 91/509 |
| 3,543,642 | A | * | 12/1970 | Seamone | 137/625.64 |
| 3,956,971 | A | * | 5/1976 | Meulendyk | 91/384 |
| 4,333,387 | A | * | 6/1982 | Seitz | 91/1 |
| 4,422,475 | A | | 12/1983 | Aspinwall | |
| 4,466,597 | A | * | 8/1984 | Vanderlaan | 251/129.03 |
| 4,472,998 | A | * | 9/1984 | Vanderlaan | 137/596.15 |
| 4,534,273 | A | * | 8/1985 | Vanderlaan | 137/596.15 |
| 4,557,527 | A | * | 12/1985 | Stumpe | 251/129.03 |
| 4,709,619 | A | * | 12/1987 | Bartholomaus et al. | 251/129.03 |
| 5,881,768 | A | * | 3/1999 | Bezos et al. | 251/14 |
| 6,386,220 | B1 | | 5/2002 | Koenings | |
| 6,811,135 | B2 | | 11/2004 | Moreno et al. | |
| 6,918,571 | B1 | | 7/2005 | Rose | |
| 6,948,514 | B1 | | 9/2005 | Kramer et al. | |
| 7,051,993 | B2 | | 5/2006 | Kim et al. | |
| 7,219,875 | B2 | | 5/2007 | Dayton | |

(Continued)

*Primary Examiner* — John Rivell
(74) *Attorney, Agent, or Firm* — Rader, Fishman & Grauer PLLC

(57) ABSTRACT

Disclosed is an exemplary valve having a first valve member that may include at least one orifice, and which is moveable between a first position and a second position, and a second valve member that includes at least one orifice, and which is moveable relative to the first valve member between a first position, in which the at least one orifice of the second valve member is fluidly disconnected from the at least one orifice of the first valve member, and a second position, in which the at least one orifice of the second valve member is fluidly connected to the at least one orifice of the first valve member. The exemplary valve may also include first and second actuators for moving the first and second valve members between their respective first and second positions.

10 Claims, 8 Drawing Sheets

(56) References Cited

U.S. PATENT DOCUMENTS

| | | |
|---|---|---|
| 7,383,851 B2 | 6/2008 | Jacobsen et al. |
| 8,366,026 B2 * | 2/2013 | Wang et al. ............... 251/14 |
| 2006/0243936 A1 * | 11/2006 | Hoang ............... 251/63 |
| 2007/0075285 A1 * | 4/2007 | Lovejoy ............... 251/129.03 |
| 2007/0079879 A1 | 4/2007 | Murrenhoff et al. |
| 2007/0151614 A1 | 7/2007 | Dayton et al. |

* cited by examiner

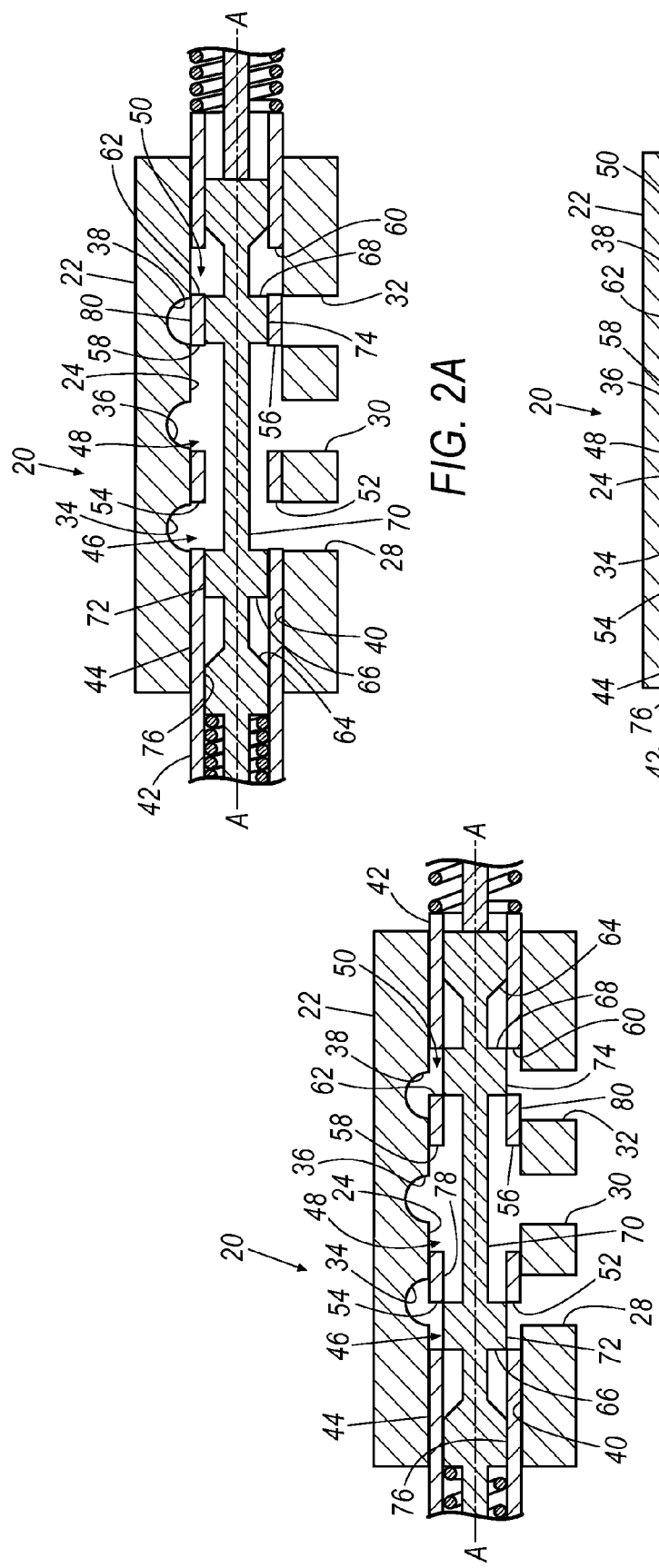
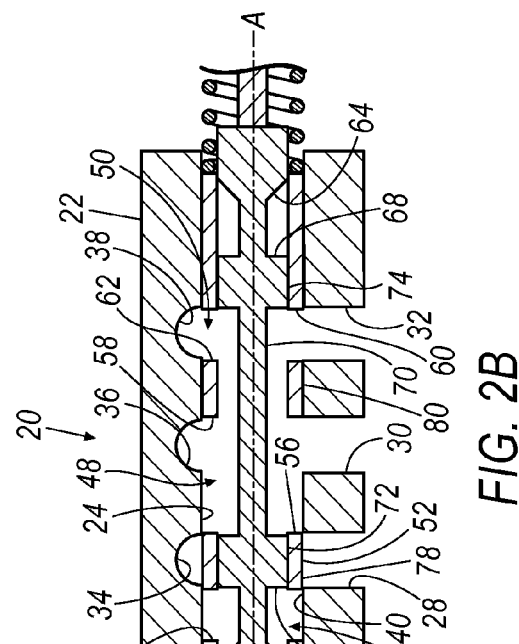
FIG. 1
FIG. 2A
FIG. 2B

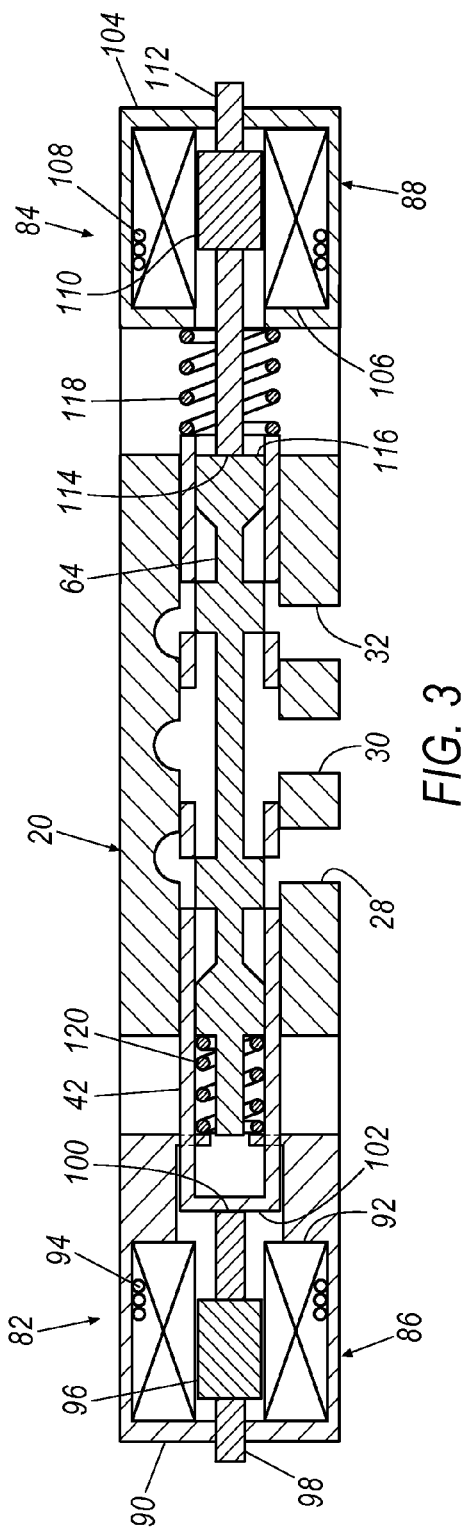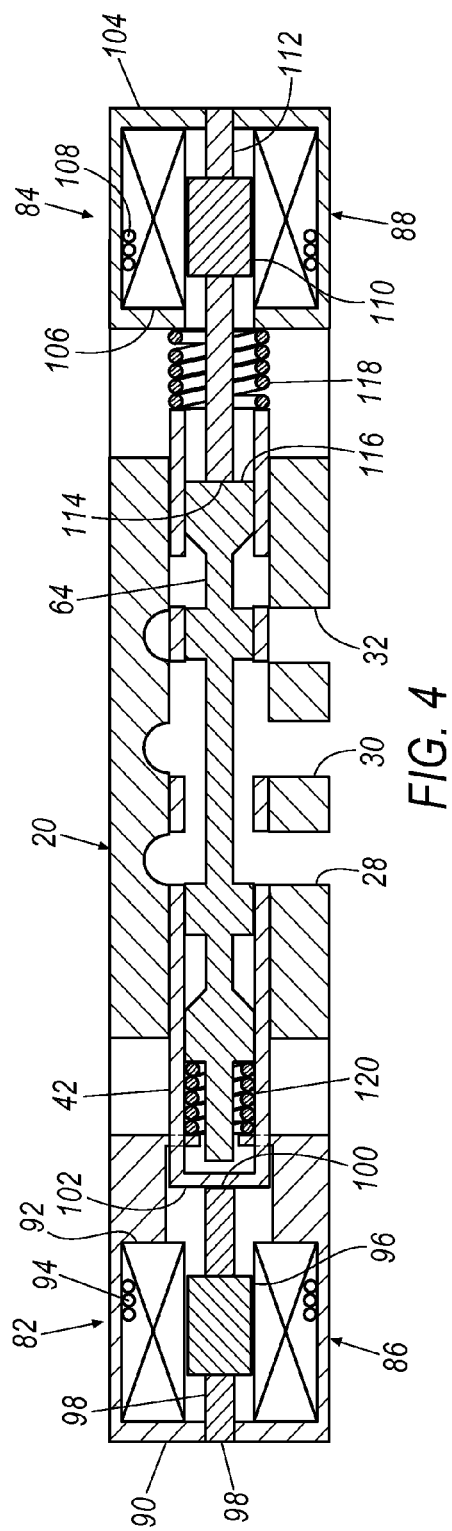

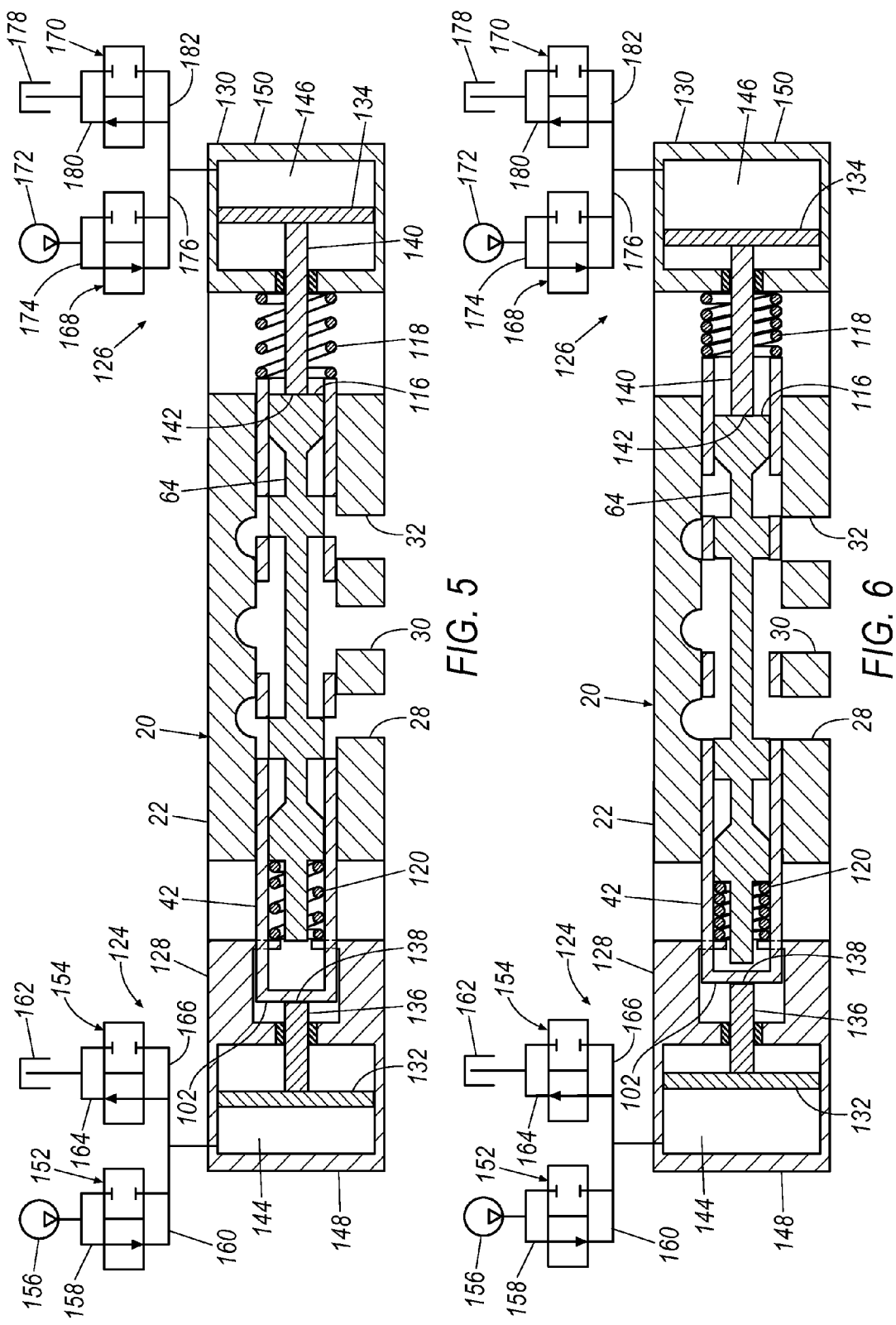

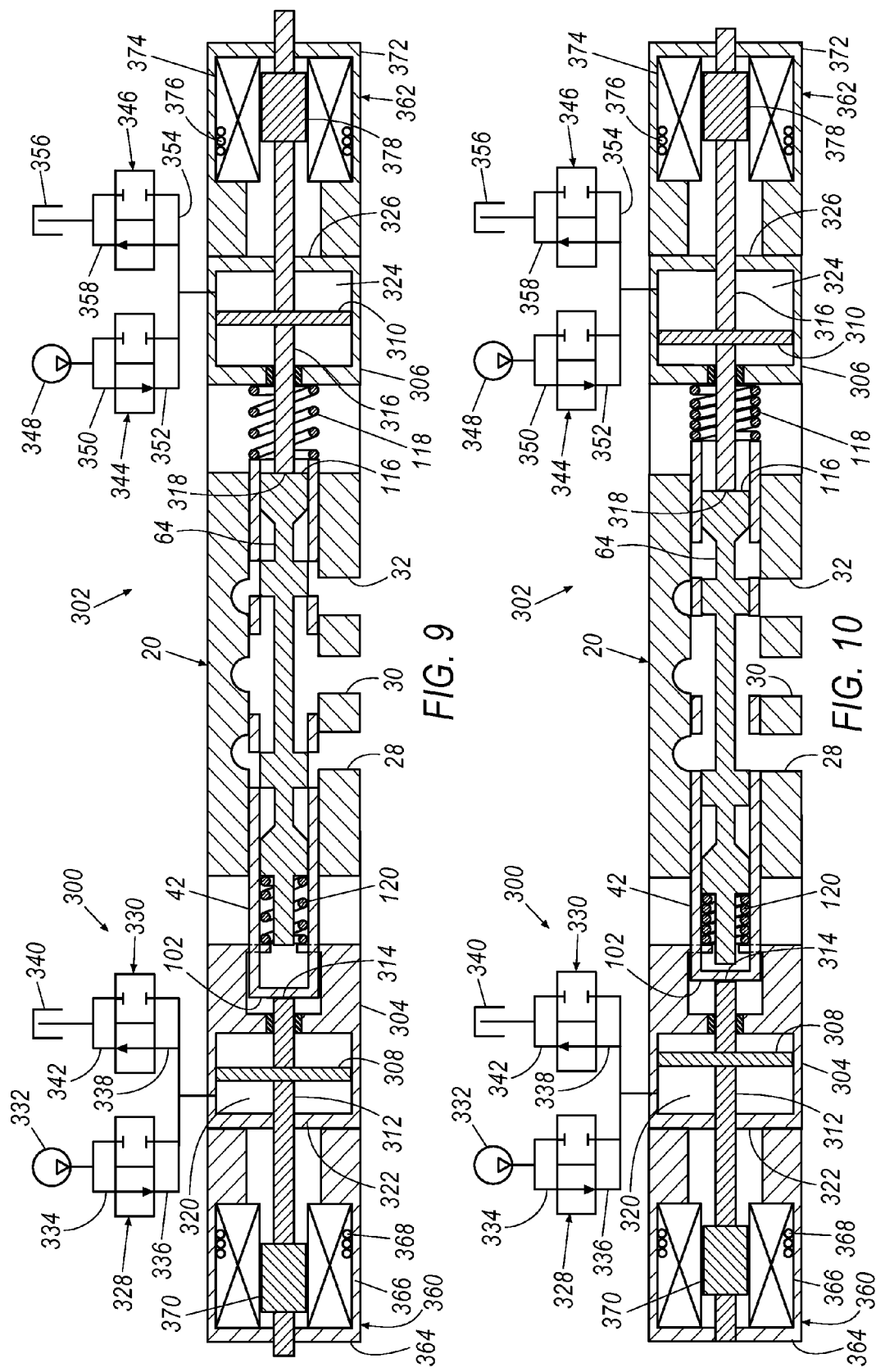

| VALVE (20) CONFIGURATION | SPOOL (64) ACTUATOR CONFIGURATION | SLEEVE (42) ACTUATOR CONFIGURATION |
|---|---|---|
| 1 (see FIGS. 3 and 4) | Electromagnetic (see note 1) | Electromagnetic (see note 1) |
| 2 | Electromagnetic (see note 1) | Hydro-mechanical (see note 2) |
| 3 | Electromagnetic (see note 1) | Hybrid Electromagnetic/ Hydro-mechanical (see note 3) |
| 4 | Electromagnetic (see note 1) | Electromagnetic and Hydro-mechanical (see note 4) |
| 5 | Hydro-mechanical (see note 2) | Electromagnetic (see note 1) |
| 6 (see FIGS. 5 and 6) | Hydro-mechanical (see note 2) | Hydro-mechanical (see note 2) |
| 7 | Hydro-mechanical (see note 2) | Hybrid Electromagnetic/ Hydro-mechanical (see note 3) |
| 8 | Hydro-mechanical (see note 2) | Electromagnetic and Hydro-mechanical (see note 4) |
| 9 | Hybrid Electromagnetic/ Hydro-mechanical (see note 3) | None (sleeve 42 is stationary relative to valve body 22) |
| 10 | Hybrid Electromagnetic/ Hydro-mechanical (see note 3) | Electromagnetic (see note 1) |
| 11 | Hybrid Electromagnetic/ Hydro-mechanical (see note 3) | Hydro-mechanical (see note 2) |
| 12 (see FIGS. 7 and 8) | Hybrid Electromagnetic/ Hydro-mechanical (see note 3) | Hybrid Electromagnetic/ Hydro-mechanical (see note 3) |
| 13 | Hybrid Electromagnetic/ Hydro-mechanical (see note 3) | Electromagnetic and Hydro-mechanical (see note 4) |
| 14 | Electromagnetic and hydro-mechanical (see note 4) | None (sleeve 42 is stationary relative to valve body 22) |
| 15 | Electromagnetic and Hydro-mechanical (see note 4) | Electromagnetic (see note 1) |
| 16 | Electromagnetic and Hydro-mechanical (see note 4) | Hydro-mechanical (see note 2) |
| 17 | Electromagnetic and Hydro-mechanical (see note 4) | Hybrid Electro-magnetic/ Hydro-mechanical (see note 3) |
| 18 (see FIGS. 9 and 10) | Electromagnetic and Hydro-mechanical (see note 4) | Electromagnetic and Hydro-mechanical (see note 4) |
| 19 | None (spool 64 is stationary relative to valve body 22) | Hybrid Electromagnetic/ Hydro-mechanical (see note 3) |
| 20 | None (spool 64 is stationary relative to valve body 22) | Electromagnetic and Hydro-mechanical (see note 4) |

Notes:
(1) An exemplary electromagnetic actuator is shown in FIGS. 3 and 4.
(2) An exemplary hydro-mechanical actuator is shown in FIGS. 5 and 6.
(3) An exemplary hybrid electromagnetic/hydro-mechanical actuator is shown in FIGS. 7 and 8.
(4) An exemplary electromagnetic and hydro-mechanical actuator is shown in FIGS. 9 and 10.

*FIG. 11*

PROPORTIONAL VALVE EMPLOYING SIMULTANEOUS AND HYBRID ACTUATION

BACKGROUND

A hydraulic system may include a variety of components, including multiple hydraulic loads, each of which may have different flow and pressure requirements that can vary over time. The hydraulic system may include a pump for supplying a flow of pressurized fluid to the hydraulic loads. The hydraulic system may further include various valves for controlling the distribution of pressurized fluid to the multiple loads. The valves may include a variety of configurations to accommodate various performance, packaging, and cost requirements of a particular application. For example, applications that have varying hydraulic flow and pressure requirements may employ a proportional valve. Proportional valves have the ability to selectively vary the rate at which hydraulic fluid passes through the valve, and its corresponding pressure. Proportional valves may be electronically or hydraulically actuated. Electronically actuated valves may, for example, employ a proportional solenoid to actuate the valve. The flow of hydraulic fluid through the solenoid actuated proportional valve is generally proportional to the magnitude of an electrical input command signal sent to the solenoid.

A hydraulically actuated proportional valve may also be actuated using a pilot stage. The pilot stage operates to control a flow of pressurized hydraulic fluid for actuating a main stage of the proportional valve. The pilot stage may be electrically of pneumatically operated. An electrically actuated pilot stage, for example, may utilize a high speed solenoid valve to actuate the pilot stage.

Electronically actuated proportional valves and hydraulically actuated proportional valves each have advantages and disadvantages. For example, electronically actuated proportional valves generally allow more precise control of hydraulic flow through the valve than may be achievable with hydraulically actuated proportional valves. In contrast, hydraulically actuated proportional valves are generally capable of controlling large volumes of fluid at high pressures, whereas a solenoid actuated proportional valve, used in the same capacity, would generally be much larger and require large amounts of electricity with unacceptable heat generation. Hydraulically actuated proportional valves generally are capable of faster response times than correspondingly sized electronically actuated proportional valves.

BRIEF DESCRIPTION OF THE DRAWINGS

FIG. 1 is a partial cross-sectional view of an exemplary proportional valve employing a sleeve and spool, each of which is moveable relative to a valve body, with the spool and sleeve shown arranged in a closed position, in which each of three fluid ports is fluidly disconnected from the remaining two ports.

FIG. 2A is a partial cross-sectional view of the proportional valve of FIG. 1, with the spool and sleeve shown arranged in a first fully open position.

FIG. 2B is a partial cross-sectional view of the proportional valve of FIG. 1, with the spool and sleeve shown arranged in a second fully open position.

FIG. 3 is a partial cross-sectional view of the proportional valve of FIG. 1, the valve employing a pair of exemplary electromagnetic actuators for positioning the spool and sleeve within the valve body, with the spool and sleeve shown arranged in the closed position.

FIG. 4 is a partial cross-sectional view of the proportional valve of FIG. 3, with the spool and sleeve shown arranged in the first fully open position.

FIG. 5 is a partial cross-sectional view of the proportional valve of FIG. 1, the valve employing a pair of exemplary hydro-mechanical actuators for positioning the spool and sleeve within the valve housing, with the spool and sleeve shown arranged in the closed position.

FIG. 6 is a partial cross-sectional view of the proportional valve of FIG. 5, with the spool and sleeve shown arranged in the first fully open position.

FIG. 9 is a partial cross-sectional view of the proportional valve of FIG. 1, the valve employing a pair of exemplary combination electromagnetic and hydro-mechanical actuators for positioning the spool and sleeve within the valve housing, with the spool and sleeve shown arranged in the closed position.

FIG. 10 is a partial cross-sectional view of the proportional valve of FIG. 9, with the spool and sleeve shown arranged in the first fully open position.

FIG. 11 is a table identifying various exemplary combinations of actuators that may be employed for actuating the spool and the sleeve.

DETAILED DESCRIPTION

Figures 7, 8:
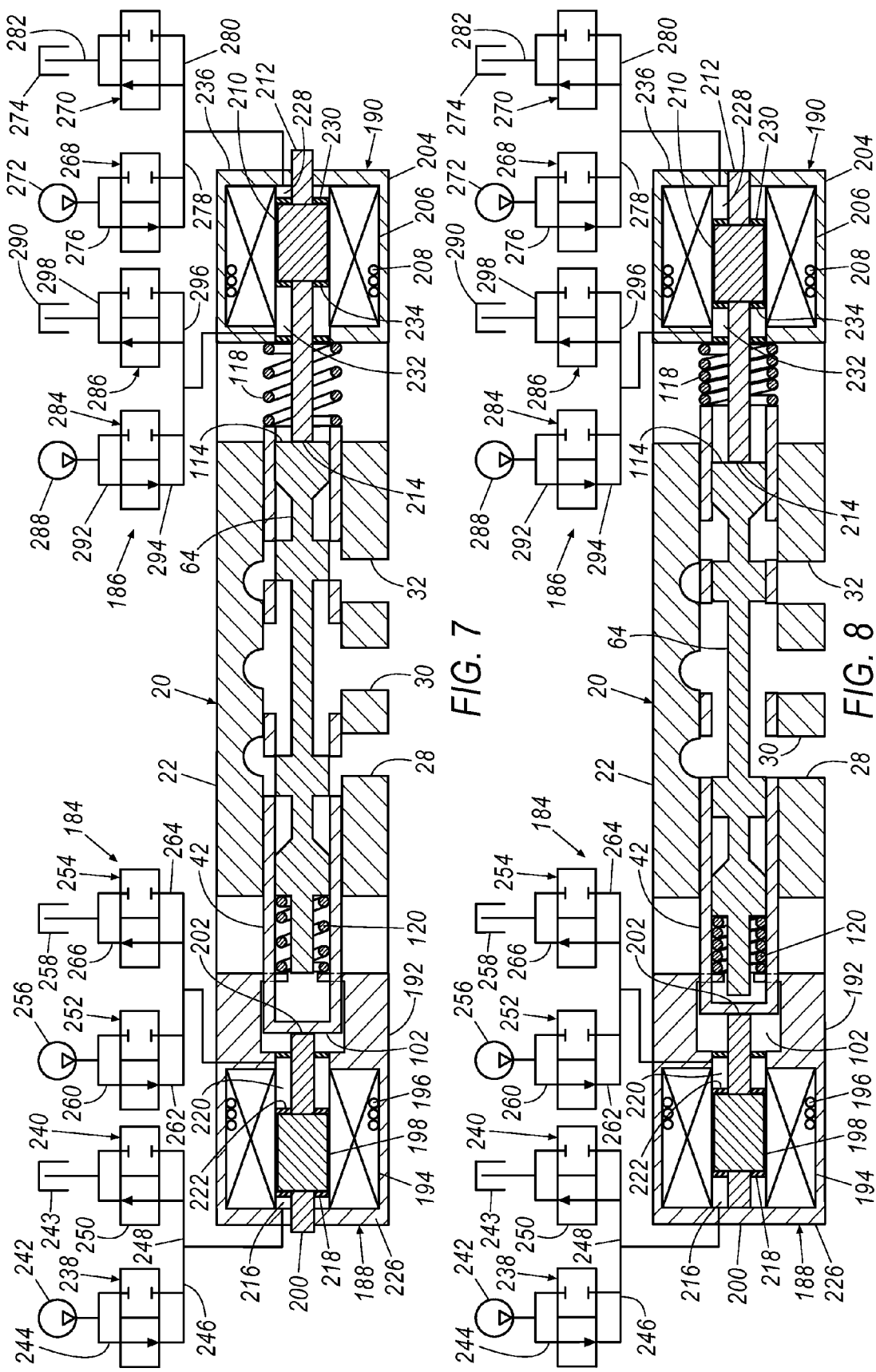
FIG. 7 is a partial cross-sectional view of the proportional valve of FIG. 1, the valve employing a pair of exemplary hybrid electromagnetic/hydro-mechanical actuators for positioning the spool and sleeve within the valve housing, with the spool and sleeve shown arranged in the closed position.
FIG. 8 is a partial cross-sectional view of the proportional valve of FIG. 7, with the spool and sleeve shown arranged in the first fully open position.

Referring now to the discussion that follows and to the drawings, illustrative approaches to the disclosed systems and methods are described and shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

FIGS. 1, 2A and 2B schematically illustrate an exemplary valve 20 for controlling distribution of a pressurized fluid between various hydraulic components, such as, for example, a pressure source, a fluid reservoir, and one or more hydraulic loads. Valve 20 may include a valve body 22 having a generally cylindrically-shaped bore 24. Valve body 22 may include any number of ports for fluidly connecting bore 24 to the various hydraulic components. For example, valve body 22 may include a first port 28 that may be fluidly connected to a pressure source, such as a pump; a second port 30 that may be fluidly connected to a hydraulic load, such as a hydraulic cylinder or a hydraulic motor; and a third port 32 that may be fluidly connected to a low pressure reservoir. These are only a few examples of the various types of hydraulic components that may be connected to valve 20. In practice, valve 20 may include a different number of ports and/or may be connected to various other hydraulic components, depending at least in part on the requirements of the particular application. As discussed in more detail subsequently, valve 20 may operate to alternately fluidly connect port 30 to ports 28 and 32 to selectively transfer fluid between the fluidly connected hydraulic components.

Valve body 22 may include one or more recessed grooves 34, 36 and 38, extending circumferentially about an inside surface 40 of bore 24. Each groove may be fluidly connected to a corresponding port 28, 30 and 32. The ports are generally positioned at discrete locations around bore 24. The grooves provide an additional flow path between bore 24 and the corresponding ports, and may operate to enhance the flow of fluid between the bore and the ports. In the exemplary valve configurations shown in FIGS. 1-10, groove 34 is shown fluidly connected to first port 28, groove 36 to second port 30, and groove 38 to third port 32.

Slidably disposed within bore 24 of valve body 22 is a generally cylindrically-shaped hollow sleeve 42. An outer surface 44 of sleeve 42 slidably engages inside surface 40 of bore 24. Sleeve 42 may include one or more sets of orifices 46, 48 and 50, arranged axially along a length of sleeve 42. Each set of orifices may include one or more orifices arranged around a circumference of sleeve 42. For example, orifice set 46 may include orifices 52 and 54 arranged on diametrically opposite sides of sleeve 42. Similarly, orifice set 48 may include orifices 56 and 58, arranged on diametrically opposite sides of sleeve 42. Finally, orifice set 50 may include orifices 60 and 62, arranged on diametrically opposite sides of sleeve 42. Each set of orifices may include fewer or more orifices. It is not necessary that each set of orifices include the same number of orifices. For example, orifice sets 46 and 50 may each include three orifices, whereas orifice set 48 may include only one orifice. Each set of orifices is associated with one of the corresponding ports 28, 30 and 32 in valve body 22. For example, orifice set 46 generally coincides with first port 28; orifice set 48 generally coincides with second port 30; and orifice set 50 generally coincides with third port 32.

Slidably received within sleeve 42 is a spool 64. Although the terms "spool" and "sleeve" are commonly used to describe components of a spool valve, the terms are not always used consistently to refer to the same components. For example, the term "sleeve" may be used to refer to the outer member and the term "spool" the inner member. Alternatively, the term "sleeve" may refer to a member that is fixed relative to the housing, whereas the term "spool" denotes a moveable member. Accordingly, to avoid confusion, throughout this application the term "sleeve" shall refer to the outer member, for example sleeve 42, and the term "spool" shall to refer to the component disposed within the outer member, for example spool 64.

Spool 64 may include a pair of axially spaced cylindrical valving lands 66 and 68 extending radially outward from a shaft 70. Valving lands 66 and 68 each include an outer circumferential surface 72 and 74, respectively, which slidably engage an interior surface 76 of sleeve 42. Valving lands 66 and 68 may be arranged axially along an axial length of valve 20 proximate to ports 28 and 32, respectively. In the illustrated example, valving lands 66 and 68 form a continuous uninterrupted ring around shaft 70.

A longitudinal axis of spool 64 and a longitudinal axis of sleeve 42 are shown generally aligned along a common axis A-A. Sleeve 42 may be selectively moved back and forth along axis A-A within bore 24 of valve body 22, and spool 64 may be selectively moved back and forth along axis A-A within sleeve 42. Both sleeve 42 and spool 64 may be moved axially along axis A-A relative to valve body 22.

Continuing to refer to FIGS. 1, 2A and 2B, spool 64 and sleeve 42 may be moved relative to one another and valve body 22 to selectively establish various fluid connections between ports 28, 30 and 32. Spool 64 and sleeve 42 are shown in FIG. 1 arranged in a closed position. In FIG. 2A, spool 64 and sleeve 42 are shown arranged in a first fully open position. FIG. 2B shows spool 64 and sleeve 42 arranged in a second fully open position. Arranging spool 64 and sleeve 42 in the closed position substantially prevents fluid from passing between second port 30 and either of the two remaining ports 28 and 32. Valve 20 may be arranged in the closed position by positioning sleeve 42 relative to ports 28 and 32, such that a first region 78 (see FIG. 1) of sleeve 42 at least partially extends across first port 28, and a second region 80 (see FIG. 1) of sleeve 42 at least partially extends across third port 32. Further, valving land 66 of spool 64 is generally aligned axially with respect to orifices 52 and 54 in sleeve 42, and valving land 68 is generally aligned axially with respect to orifices 60 and 62 in sleeve 42. Arranging sleeve 42 and spool 64 in this way operates to generally block the flow path through ports 28 and 32, thereby preventing fluid communication between second port 30 and either of the remaining two ports 28 and 32.

A fluid connection between second port 30 and either of the two remaining ports 28 and 32 may be selectively established by sliding spool 64 and sleeve 42 in opposite directions relative to valve body 22. Valve 20 may be arranged in either of the two fully open positions (i.e., the first fully open position, as shown in FIG. 2A, and the second fully open position, as shown in FIG. 2B), as well as an infinite number of positions between the fully open positions, including the closed position (as shown in FIG. 1). Arranging valve 20 in the first fully open position, as shown in FIG. 2A, establishes a fluid connection between second port 30 and first port 28. Arranging valve 20 in the second fully open position, as shown in FIG. 2B, establishes a fluid connection between second port 30 and third port 32. Generally, second port 30 is fluidly disconnected from third port 32 when valve 20 is arranged in any position between, and including, the closed position and the first fully open position. Second port 30 is fluidly disconnected from first port 28 when valve 20 is arranged in any position between, and including, the closed position and the second fully open position.

With continued reference to FIG. 2A, valve 20 may be arranged in the first fully open position, wherein second port 30 is fluidly connected to first port 28, by sliding sleeve 42 to the right from its position in FIG. 1 (as viewed from the perspective shown in FIGS. 1 and 2A) so as to generally align orifice 52 of sleeve 42 with first port 28, and by sliding spool 64 in the opposite direction of sleeve 42, (i.e., to the left of the spool position shown in FIG. 1), such that valving land 66 does not overlap orifices 52 and 54 in sleeve 42. Spool 64 and sleeve 42 may be infinitely positioned between the closed position, as shown in FIG. 1, and the first fully open position, as shown in FIG. 2A. Arranging spool 64 and sleeve 42 in any of the partially open positions will produce varying degrees of overlap between valving land 66 and orifices 52 and 54, thereby controlling the amount of flow passing through first port 28 and second port 30.

Moving spool 64 and sleeve 42 to open the flow path between second port 30 and first port 28 will cause a corresponding displacement of valving land 68 of spool 64 and orifices 60 and 62 of sleeve 42 relative to third port 32. With spool 64 and sleeve 42 arranged in the first fully open position, as shown in FIG. 2A, valving land 68 will be generally aligned axially with third port 32, and orifices 60 and 62 of sleeve 42 will be displaced to the right of third port 32, such that region 80 of sleeve 42 substantially entirely overlaps third port 32, thereby preventing fluid from passing through third port 32 when sleeve 42 and spool 64 are positioned anywhere between the fully closed position (as shown in FIG. 1) and the first fully open position (as shown in FIG. 2A). Positioning spool 64 and sleeve 42 in any of the partially open positions between the fully closed and the first fully open position will decrease the amount of overlap between valving land 68 and region 80 of spool 42, but the resulting overlap should be sufficient to substantially block fluid from passing through third port 32.

With continued reference to FIG. 2B, valve 20 may be arranged in the second fully open position relative to third port 32 by displacing spool 64 to the right from its closed position in FIG. 1 (as viewed from the perspective shown in FIGS. 1 and 2B), and sleeve 42 to the left from its closed position in FIG. 1. With valve 20 arranged in the second fully open position, spool 64 and sleeve 42 are located in a generally mirror opposite position of that which is shown in FIG. 2A. Spool 64 and sleeve 42 may be infinitely positioned between the closed position, as shown in FIG. 1, and the second fully open position, as shown in FIG. 2B. Arranging spool 64 and sleeve 42 in any of the partially open positions will produce varying degrees of overlap between valving land 68 of spool 64 and orifices 60 and 62 of sleeve 42, thereby controlling the amount of flow passing through second port 30 and third port 32.

Moving spool 64 and sleeve 42 to open the flow path between second port 30 and third port 32 causes a corresponding displacement of valving land 66 of spool 65 and orifices 52 and 54 of sleeve 42 relative to first port 28. With spool 64 and sleeve 42 arranged in the second fully open position, as shown in FIG. 2B, valving land 66 will be generally aligned axially with first port 28, and orifices 52 and 54 of sleeve 42 will be displaced to the left (as viewed from the perspective shown in FIG. 2B) of first port 28, such that region 78 of sleeve 42 substantially entirely overlaps first port 28, thereby preventing fluid from passing through first port 28 when sleeve 42 and spool 64 are positioned anywhere between the fully closed position (as shown in FIG. 1) and the second fully open position (as shown in FIG. 2B). Positioning spool 64 and sleeve 42 in any of the partially open positions between the fully closed and the second fully open position will decrease the amount of overlap between valving land 66 and region 78 of spool 42, but the resulting overlap will be sufficient to substantially block fluid from passing through first port 28.

Valve 20 may be operated by displacing spool 64 and sleeve 42 to selectively establish a fluid connection between second port 30 and first port 28, and second port 30 and third port 32. Separate position sensors may be provided for monitoring the position of spool 64 and sleeve 42. Spool 64 and sleeve 42 may be moved simultaneously or sequentially, or only one of the members may be moved while the other member is held stationary relative to valve body 22. Spool 64 and sleeve 42, however, are generally moved in opposite directions to establish the various fluid connections between ports 28, 30 and 32. Simultaneously moving spool 64 and sleeve 42 in opposite directions as a means for controlling the flow through the ports may significantly reduce the response time of the valve since the spool and sleeve travel only half the distance that either member would travel if only one of the members were moved to produce the same flow area. The decreased travel distance, in conjunction with simultaneous operation of the spool and sleeve, may generally result in a corresponding decrease in the response time required to actuate the valve, thereby increasing the overall performance of the valve.

Although spool 64 and sleeve 42 are generally moved in opposite directions when operating valve 20, there may be instances in which the two members are moved in the same direction. For example, one of the members may be moved to compensate for misalignment of the member being moved. This movement may be in the same direction as the other member if both members happen to be moving simultaneously. There may also be other instances in which it may be desirable to move spool 64 and sleeve 42 in the same direction, but generally speaking, valve performance may be maximized by moving sleeve 42 and spool 64 in opposite directions to minimize the valve response time.

Valve 20 may have any of a variety of configurations depending, at least in part, on the performance, operational, and design requirements of the particular application. For purposes of discussion, exemplary valve 20 is shown configured as a two position, three-way valve, having a total of three ports, which include first port 28, second port 30 and third port 32. Valve 20 may be arranged in two distinct positions, one position fluidly connecting second port 30 to first port 28, and the other fluidly connecting second port 30 to third port 32, and thus may be generally classified as a two position valve. Other valve configurations may also be employed. By way of example, and without limitation, valve 20 may be configured to include any number of ports, such as two-way valve having two ports and a four-way valve having four ports. Valve 20 may also be configured to have more than two positions. In practice, the number of ports and available positions will depend, at least in part, on the design requirements of the particular application.

Various actuators may be employed for operating spool 64 and sleeve 42. These may include, but are not limited to, electromagnetic actuators, an example of which is shown in FIGS. 3 and 4; hydro-mechanical actuators, an example of which is shown in FIGS. 5 and 6; hybrid electromagnetic/hydro-mechanical actuators, an example of which is shown in FIGS. 7 and 8; and combination actuators employing both an electromagnetic actuator and a hydro-mechanical actuator, and example of which is shown in FIGS. 9 and 10. Using separate actuators to independently operate spool 64 and sleeve 42 may significantly increase the performance of the valve. For example, spool 64 and sleeve 42 may be operated substantially simultaneously and in opposite directions, which may significantly reduce the actuating time of valve 20. The ability to move both spool 64 and sleeve 42 to actuate valve 20 also provides redundancy should an actuator for either the spool or sleeve becomes inoperative. For example, if the actuator for operating spool 64 ceases working, the actuator for sleeve 42 will continue to operate the sleeve, thereby enabling valve 20 to continue operating, although at possibly a slower actuating speed. Further, using a combination of actuators to operate a particular valve member (i.e., spool 64 sleeve 42) may take advantage of each type of actuator, while minimizing the disadvantages. For example, a combination electromagnetic actuator and hydro-mechanical actuator may exhibit the high actuation speed of a hydro-mechanical actuator and the precise control of an electromagnetic actuator. Each of the four exemplary actuators is discussed in more detail subsequently.

Referring also to FIGS. 3 and 4, a first solenoid type electromagnetic actuator 82 may be employed for selectively operating sleeve 42, and a second solenoid type electromagnetic actuator 84 may be employed for selectively operating spool 64. For purposes of discussion, the two actuators are described as having the same general configuration. It is not necessary, however, that both actuators 82 and 84 be identically configured, or even similarly configured. Further, as will be discussed in more detail below, it is not necessary that both actuators be of the same type. For example, one actuator may be hydro-mechanical and the other electromagnetic. In practice, the type and configuration of the actuators employed may depend, at least in part, on the design and performance requirements of the particular application.

Actuator 82 may include a first proportional solenoid 86, and actuator 84 may include a second proportional solenoid 88. Solenoids 86 and 88 may assume an infinite number of controlled positions within their respective working ranges. First solenoid 86 may include a housing 90. Disposed within housing 90 is a generally cylindrically-shaped coil 92 consisting of a coiled wire 94. The ends of wire 94 may be electrically connected to an electrical power source for supplying a current to coil 92. Moveably disposed within coil 92 is an armature 96 made of a magnetic material. Armature 96 may be attached to an actuating rod 98. An end 100 of actuating rod 98 engages an end 102 of sleeve 42. Actuating rod 98 may be releasably attached to, fixedly attached to, or integrally formed with sleeve 42.

Second solenoid 88 may include a housing 104. Disposed within housing 104 is a generally cylindrically-shaped coil 106 consisting of a coiled wire 108. The ends of wire 108 may be electrically connected to an electrical power source for supplying a current to coil 106. Moveably disposed within coil 106 is an armature 110 made of a magnetic material. Armature 110 may be attached to an actuating rod 112. An end 114 of actuating rod 112 engages an end 116 of spool 64. Actuating rod 112 may be releasably attached to, fixedly attached to, or integrally formed with spool 64.

Solenoid 86 may be energized to generate an electromagnetic force that acts upon armature 96 by passing current through coil 92. Similarly, solenoid 88 may be energized to generate an electromagnetic force that acts upon armature 110 by passing current through coil 106. Actuating rod 98 attached to armature 96 transmits the force produced by coil 92 to sleeve 42, and actuating rod 112 attached to armature 110 transmits the force produced by coil 106 to spool 64. The position of the solenoids 86 and 88 may be controlled by varying the input current to their respective coils 92 and 106. The current level determines the amount of force transferred to sleeve 42 and spool 64. Varying the current causes the corresponding spool 64 and sleeve 42 to move variable distances. The force on armatures 96 and 110, and therefore the armature movement, is generally proportional to the current passing through coil 92 and coil 106, respectively. By varying the current applied the respective coils, solenoid 86 and solenoid 88 adjust the movement of sleeve 42 and spool 64, respectively, to vary the flow through valve 20.

Valve 20 may also employ a first return spring 118 for biasing sleeve 42 toward actuator 82, and a second return spring 120 for biasing spool 64 toward actuator 84. First return spring 118 exerts a biasing force against sleeve 42 opposite the force produced by solenoid 86 of actuator 82. Similarly, second return spring 120 exerts a biasing force against spool 64 opposite the force produced by solenoid 88 of actuator 84. Return springs 118 and 120 urge spool 42 and sleeve 64, respectively, toward the second fully open position, as shown in FIG. 2B. Sleeve 42 may be moved in a direction away from the second fully open position (as shown in FIG. 2B) and toward the first fully open position (as shown in FIG. 2A) by applying a current to coil 92 of solenoid 86 that causes the solenoid to generate a force sufficient to overcome the biasing force of first return spring 118. The solenoid force tends to move sleeve 42 in a direction away from actuator 82 until a balance is achieved between the force generated by solenoid 86 and the biasing force of first return spring 118. Likewise, spool 64 may be moved in a direction away from the second fully open position (as shown in FIG. 2B) and toward the first fully open position (as shown in FIG. 2A) by applying a current to coil 106 of solenoid 88 that causes the solenoid to generate a force sufficient to overcome the biasing force of second return spring 120. The solenoid force tends to move spool 64 in a direction away from actuator 84 until a balance is achieved between the solenoid force generated by solenoid 88 and the biasing force of second return spring 120. Thus, the flow through ports 28, 30 and 32 may be controlled by selectively varying the current applied to coil 92 of solenoid 86 and coil 106 of solenoid 88.

Return springs 118 and 120 may be sized to achieve a desired balance between the response time when moving sleeve 42 and spool 64 in a direction from the second fully open position (as shown in FIG. 2B) toward the first fully open position (as shown in FIG. 2A), and the response time when moving sleeve 42 and spool 64 in an opposite direction from the first fully open position toward the second fully open position. Adjusting the spring rate of the return springs generally has an opposite effect on the response times. Increasing the spring rate generally results in a corresponding increase in the response time when moving spool 64 and sleeve 42 in the direction from the second fully open position toward the first fully open position, and a corresponding decrease in the response time when moving spool 64 and sleeve 42 in the direction from the first fully open position toward the second fully open position. The corresponding increase in the response time when moving the spool and sleeve in the direction from the second fully open position toward the first fully open position is due to the biasing force of the return springs tending to resist the motion of the solenoid actuators. The corresponding increase in response time when moving the spool and sleeve in the direction from the second fully open position toward the first fully open position may be overcome, for example, by increasing the actuation force produce by solenoid 88 and solenoid 86. Conversely, decreasing the spring rate of the return springs generally results in a corresponding increase in the response time when moving spool 64 and sleeve 42 in a direction from the first fully open position (as shown in FIG. 2A) toward the second fully open position (as shown in FIG. 2B), and a decrease in the response time when moving spool 64 and sleeve 42 in a direction from the second fully open position to the first fully open position. The sizing of return springs 118 and 120 may depend on various factors, including but not limited to, the magnitude of the actuation force applied to spool 64 and sleeve 42, as well as the desired valve response times required for a particular application.

Electromagnetic actuators 82 and 84 are operable to selectively position sleeve 42 and spool 64 at an infinite number of positions, between and including, the first fully open position (as shown in FIGS. 2A and 4) and the second fully open position (as shown in FIG. 2B). Sleeve 42 and spool 64 may be positioned in a desired position by varying the current applied to coil 92 of solenoid 86 and coil 106 of solenoid 88, respectively. For example, spool 64 and sleeve 42 may be positioned in the closed position, as shown in FIGS. 1 and 3, by increasing the current beyond what is required to maintain the spool and sleeve in the second fully open position (as shown in FIG. 2B). Increasing the current further tends to move spool 64 and sleeve 42 from the closed position, as shown in FIG. 3, to the first fully open position, as shown in FIG. 4. Decreasing the current applied to coil 92 of solenoid 86 tends to cause the biasing force produced by first return spring 118 to move sleeve 42 back toward the second fully open position. Decreasing the current applied to coil 106 of solenoid 88 tends to cause the biasing force produced by second return spring 120 to move spool 64 back toward the second fully open position.

Referring also to FIGS. 5 and 6, valve 20 may be configured as a two stage or pilot operated valve. A first hydro-mechanical type actuator 124 may be employed for selectively operating sleeve 42, and a second hydraulic-mechanical actuator 126 may be employed for selectively operating spool 64. For purposes of discussion, the two actuators are described as having the same general configuration. It is not necessary, however, that both actuators be identically configured, or even similarly configured. Further, as will be discussed in more detail subsequently, it is not necessary that both actuators be of the same type. For example, one actuator may be hydro-mechanical and the other electromagnetic. In practice, the type and configuration of the actuator employed may depend, at least in part, on the design and performance requirements of the particular application.

Actuator 124 may include a housing 128, and actuator 126 may each include a housing 130. Slidably disposed within housing 128 is a piston 132, and slidably disposed within housing 130 is a piston 134. Piston 132 and piston 134 may assume an infinite number of controlled positions within their working ranges. Piston 132 may be attached to an actuating rod 136. An end 138 of actuating rod 136 engages end 102 of sleeve 42. Actuating rod 136 of first hydro-mechanical actuator 124 may be releasably attached to, fixedly attached to, or integrally formed with sleeve 42.

Piston 134 of actuator 126 may be attached to an actuating rod 140. An end 142 of actuating rod 140 engages end 116 of spool 64. Actuating rod 140 of second hydro-mechanical actuator 126 may be releasably attached to, fixedly attached to, or integrally formed with spool 64.

Piston 132 and housing 128 of first hydro-mechanical actuator 124 at least partially define a fluid cavity 144 for receiving a pressurized fluid. Similarly, piston 134 and housing 130 of second hydro-mechanical actuator 126 at least partially define a fluid cavity 146 for receiving a pressurized fluid. Pressurized fluid present within fluid cavity 144 generates a force against piston 132 that tends to urge the piston away from an end wall 148 of housing 128. Actuating rod 136 attached to piston 132 transmits the force to sleeve 42. Similarly, pressurized fluid present within fluid cavity 146 generates a force against piston 134 that tends to urge the piston away from an end wall 150 of housing 130. Actuating rod 140 attached to piston 134 transmits the force to spool 64. The position of piston 132 and piston 134 may be controlled by varying the pressure within the respective fluid cavities 144 and 146. The pressure within the fluid cavities 144 and 146 determines the amount of force transferred to sleeve 42 and spool 64. Varying the pressure applied to piston 132 and piston 134 adjusts the movement of sleeve 42 and spool 64 to vary the flow through valve 20.

The pressure within fluid cavity 144 of first hydro-mechanical actuator 124 may be controlled by means of a supply pilot valve 152 and a return pilot valve 154. Supply pilot valve 152 and return pilot valve 154 may be electromagnetically actuated, for example, by a solenoid valve, or may be pneumatically or hydraulically actuated. In the exemplary configuration shown in FIGS. 5 and 6, pilot valves 154 and 156 are electromagnetically actuated. Supply pilot valve 152 may be fluidly connected to a pressure source 156 through a first supply passage 158, and to fluid cavity 144 through a second supply passage 160. Return pilot valve 154 may be fluidly connected to a reservoir 162 through a first return passage 164, and to fluid cavity 144 through a second return passage 166. The pressure within fluid cavity 144 may be selectively increased by transferring fluid from pressure source 156 to fluid cavity 144 through supply pilot valve 152, and may be selectively decreased by transferring fluid from fluid cavity 144 to reservoir 162 through return pilot valve 154. Pressurizing fluid cavity 144 causes a force to be exerted against piston 132 that tends to move sleeve 42 in a generally axial direction relative to valve body 22 and away from end wall 148 of housing 128.

The pressure within fluid cavity 146 may be controlled by means of a solenoid operated supply pilot valve 168 and a solenoid operated return pilot valve 170. Supply pilot valve 168 may be fluidly connected to a pressure source 172 through a first supply passage 174, and to fluid cavity 146 through a second supply passage 176. Return pilot valve 170 may be fluidly connected to a reservoir 178 through a first return passage 180, and to fluid cavity 146 through a second return passage 182. The pressure within fluid cavity 146 may be selectively increased by transferring fluid from pressure source 172 to fluid cavity 146 through supply pilot valve 168, and may be selectively decreased by transferring fluid from fluid cavity 146 to reservoir 178 through return pilot valve 170. Pressurizing fluid cavity 146 causes a force to be exerted against piston 134 that tends to move spool 64 in a generally axial direction relative to valve body 22 and away from end wall 150 of housing 130.

Valve 20 may also employ first return spring 118 for biasing sleeve 42 toward actuator 124, and second return spring 120 for biasing spool 64 toward actuator 126. First return spring 118 exerts a biasing force against sleeve 42 that is opposite the force produced by piston 132 of actuator 124. Similarly, second return spring 120 exerts a biasing force against spool 64 that is opposite the force produced by piston 134 of actuator 126. Return springs 118 and 120 urge sleeve 42 and spool 64, respectively, toward the second fully open position, as shown in FIG. 2B. Sleeve 42 may be moved in a direction away from the second fully open position (as shown in FIG. 2B) and toward the first fully open position (as shown in FIG. 2A) by pressurizing fluid cavity 144 of actuator 124 to exert a force against piston 132 sufficient to overcome the biasing force of first return spring 118. The piston force tends to move sleeve 42 in a direction away from actuator 124 until a balance is achieved between the force transferred by piston 132 of actuator 124 and the biasing force of first return spring 118. Likewise, spool 64 may be moved in a direction away from the second fully open position (as shown in FIG. 2B) and toward the first fully open position (as shown in FIG. 2A) by pressurizing fluid cavity 146 of actuator 126 to exert a force against piston 134 sufficient to overcome the biasing force of second return spring 120. The piston force tends to move spool 64 in a direction away from actuator 126 until a balance is achieved between the force transferred by piston 134 of actuator 126 and the biasing force of second return spring 120. Thus, the flow through ports 28, 30 and 32 may be controlled by selectively varying the pressure within fluid cavity 144 of actuator 124 and fluid cavity 146 of actuator 126.

Return springs 118 and 120 may be sized to achieve a desired balance between the response time when moving sleeve 42 and spool 64 in a direction from the second fully open position (as shown in FIG. 2B) toward the first fully open position (as shown in FIG. 2A), and the response time when moving sleeve 42 and spool 64 in an opposite direction from the first fully open position toward the second fully open position. Adjusting the spring rate of the return springs generally has an opposite effect on the response times. Increasing the spring rate generally results in a corresponding increase in the response time when moving spool 64 and sleeve 42 in the direction from the second fully open position toward the first fully open position, and a corresponding decrease in the response time when moving spool 64 and sleeve 42 in the direction from the first fully open position toward the second fully open position. The corresponding increase in the response time when moving the spool and sleeve in the direction from the second fully open position toward the first fully open position is due to the biasing force of the return springs tending to resist the motion of the hydraulic actuator. The corresponding increase in response time when moving the spool and sleeve in the direction from the second fully open position toward the first fully open position may be overcome, for example, by increasing the pressure used to activate the sleeve and spool. Conversely, decreasing the spring rate of the return springs generally results in a corresponding increase in the response time when moving spool 64 and sleeve 42 in a direction from the first fully open position (as shown in FIG. 2A) toward the second fully open position (as shown in FIG. 2B), and a decrease in the response time when moving spool 64 and sleeve 42 in a direction from the second fully open position to the first fully open position. The sizing of the return springs may depend on various factors, including but not limited to the magnitude of the actuation force applied to spool 64 and sleeve 42, as well as the desired valve response times required for a particular application.

Hydro-mechanical actuators 124 and 126 are operable to selectively position spool 64 and sleeve 42 at an infinite number of locations, between and including, the first fully open position (as shown in FIG. 2A) and the second fully open position (as shown in FIG. 2B). Spool 64 and sleeve 42 may be located in a desired position by varying the pressure within fluid cavity 146 of actuator 126 and fluid cavity 144 of actuator 124. For example, spool 64 and sleeve 42 may be positioned in the closed position, as shown in FIGS. 1 and 5, by increasing the pressure within fluid cavities 144 and 146 beyond that which is required to maintain the spool and sleeve in the second fully open position (as shown in FIG. 2B). Increasing the pressure within fluid cavities 146 and 144 further tends to move spool 64 and sleeve 42 from the closed position, as shown in FIG. 5, to the first fully open position, as shown in FIG. 6.

Although two separate pressure sources 156 and 172 are described for providing pressurized fluid to fluid cavities 144 and 146, respectively, a single pressure source may also be employed for supplying the pressurized fluid to the fluid cavities. Likewise, although two separate reservoirs 162 and 178 are described, in practice, a single reservoir may be employed.

Referring also to FIGS. 7 and 8, valve 20 may employ a first hybrid electromagnetic/hydro-mechanical actuator 184 for selectively operating sleeve 42, and a second hybrid electromagnetic/hydro-mechanical actuator 186 for selectively operating spool 64. Hybrid electromagnetic/hydro-mechanical actuators 184 and 186 combine various features of electromagnetic actuators 82 and 84, and hydro-mechanical actuators 124 and 126. For purposes of discussion, the two actuators are described as having the same general configuration. It is not necessary, however, that both actuators be identically configured, or even similarly configured. Further, as will be discussed in more detail subsequently, it is not necessary that both actuators be of the same type. In practice, the type and configuration of the actuators employed may depend, at least in part, on the design and performance requirements of the particular application.

Actuator 184 may include a first proportional solenoid 188, and actuator 186 may each include a second proportional solenoid 190. Solenoids 188 and 190 may assume an infinite number of controlled positions within their respective working ranges. First solenoid 188 may include a housing 192. Disposed within housing 192 is a generally cylindrically-shaped coil 194 consisting of a coiled wire 196. The ends of wire 196 may be electrically attached to an electrical power source for supplying a current to the coil. Moveably disposed within coil 194 is an armature 198 made of a magnetic material. Armature 198 may be attached to an actuating rod 200. An end 202 of actuating rod 200 engages end 102 of sleeve 42. Actuating rod 200 may be releasably attached to, fixedly attached to, or integrally formed with sleeve 42.

Second solenoid 190 may include a housing 204. Disposed within housing 204 is a generally cylindrically-shaped coil 206 consisting of a coiled wire 208. The ends of wire 208 may be electrically attached to an electrical power source for supplying a current to the coil. Moveably disposed within coil 206 is an armature 210 made of a magnetic material. Armature 210 may be attached to an actuating rod 212. An end 214 of actuating rod 212 engages end 114 of spool 64. Actuating rod 212 may be releasably attached to, fixedly attached to, or integrally formed with spool 64.

First solenoid 188 may be energized to generate an electromagnetic force that acts upon armature 198 by passing current through coil 194, and second solenoid 190 may be energized to generate an electromagnetic force that acts upon armature 210 by passing current through coil 206. Actuating rod 200 attached to armature 198 transmits the force to sleeve 42, and actuating rod 212 attached to armature 210 transmits the force to spool 64. The position of the solenoids may be at least partially controlled by varying the input current to their respective coils. The current level of the electrical signal applied to the respective coils at least partially determines the amount of force transferred to sleeve 42 and spool 64. Varying the current applied to coil 194 and coil 206 adjusts the movement of the corresponding spool and sleeve to vary the flow through valve 20.

Armatures 198 and 210 may also operate as pistons for transferring a hydraulic force produced by a pressurized fluid to the corresponding sleeve 42 and spool 64. First actuator 184 may include a first fluid cavity 216 arranged adjacent a first end 218 of armature 198, and a second fluid cavity 220 arranged adjacent a second end 222 of armature 198. First and second fluid cavities 216 and 220 may be configured to receive a pressurized fluid. The pressurized fluid generates a force against armature 198. Fluid pressure within first fluid cavity 216 tends to move armature 198 away from an end wall 226 of housing 192, whereas the fluid pressure within second fluid cavity 220 tends to move armature 198 toward end wall 226. Actuating rod 200 attached to armature 198 transmits the force to sleeve 42. The position of armature 198 may be at least partially controlled by varying the pressure within first and second fluid cavities 216 and 220.

Second actuator 186 may include a first fluid cavity 228 arranged adjacent a first end 230 of armature 210, and a second fluid cavity 232 arranged adjacent a second end 234 of armature 210. First and second fluid cavities 228 and 232 may be configured to receive a pressurized fluid. The pressurized fluid generates a force against armature 210. Fluid pressure within first fluid cavity 228 tends to move armature 210 away from an end wall 236 of housing 204, whereas the fluid pressure within second fluid cavity 232 tends to move armature 210 toward end wall 236. Actuating rod 212 attached to armature 210 transmits the force to spool 64. The position of armature 210 may be at least partially controlled by varying the pressure within first and second fluid cavities 228 and 232. Varying the pressure applied to armatures 198 and 210 adjusts the movement of the corresponding spool and sleeve to vary the flow through valve 20.

The pressure within first fluid cavity 216 of first actuator 184 may be at least partially controlled by means of a first supply pilot valve 238 and a first return pilot valve 240. Supply pilot valve 238 and return pilot valve 240 may be electromagnetically actuated, for example, by a solenoid valve, or may be pneumatically or hydraulically actuated. In the exemplary configuration shown in FIGS. 7 and 8, pilot valves 238 and 240 are electromagnetically actuated. Although shown as two separate pilot valves 238 and 240, the pilot valves may be configured as a single pilot valve. First supply pilot valve 238 is operable to control a flow of fluid from a first pressure source 242 to first fluid cavity 216. First return pilot valve 240 is operable to control a flow of fluid from first fluid cavity 216 to a first reservoir 243.

First supply pilot valve 238 may be fluidly connected to first pressure source 242 through a first supply passage 244, and to first fluid cavity 216 through a second supply passage 246. First return pilot valve 240 may be fluidly connected to first fluid cavity 216 through a first return passage 248, and to first reservoir 243 through a second return passage 250. The pressure within first fluid cavity 216 may be selectively increased by transferring fluid from first pressure source 242 to first fluid cavity 216 through first supply pilot valve 238, and may be selectively decreased by transferring fluid from first fluid cavity 216 to first reservoir 243 through first return pilot valve 240. Pressurizing first fluid cavity 216 causes a force to be exerted against armature 198 that tends to move sleeve 42 in a generally axial direction relative to valve body 22 and away from end wall 226 of housing 192.

The pressure within second fluid cavity 220 of first actuator 184 may be at least partially controlled by means of a second supply pilot valve 252, and a second return pilot valve 254. Supply pilot valve 252 and return pilot valve 254 may be electromagnetically actuated, for example, by a solenoid valve, or may be pneumatically or hydraulically actuated. In the exemplary configuration shown in FIGS. 5 and 6, pilot valves 252 and 254 are electromagnetically actuated. Although shown as two separate pilot valves 252 and 254, the pilot valves may be configured as a single pilot valve. Second supply pilot valve 252 is operable to control a flow of fluid from a second pressure source 256 to second fluid cavity 220. Second return pilot valve 254 is operable to control a flow of fluid from second fluid cavity 220 to a second reservoir 258. Second supply pilot valve 252 may be fluidly connected to second pressure source 256 through a third supply passage 260, and to second fluid cavity 220 through a fourth supply passage 262. Second return pilot valve 254 may be fluidly connected to second fluid cavity 220 through a third return passage 264, and to second reservoir 258 through a fourth return passage 266. The pressure within second fluid cavity 220 may be selectively increased by transferring fluid from second pressure source 256 to second fluid cavity 220 through second supply pilot valve 252, and may be selectively decreased by transferring fluid from second fluid cavity 220 to second reservoir 258 through second return pilot valve 254. Pressurizing second fluid cavity 220 causes a force to be exerted against armature 198 that tends to move sleeve 42 in a generally axially direction relative to valve body 22 and toward end wall 226 of housing 192.

The pressure within first fluid cavity 228 of second actuator 186 may be at least partially controlled by means of a first supply pilot valve 268 and a first return pilot valve 270. Supply pilot valve 268 and return pilot valve 270 may be electromagnetically actuated, for example, by a solenoid valve, or may be pneumatically or hydraulically actuated. In the exemplary configuration shown in FIGS. 5 and 6, pilot valves 268 and 270 are electromagnetically actuated. Although shown as two separate pilot valves 268 and 270, the pilot valves may be configured as a single pilot valve. First supply pilot valve 268 is operable to control a flow of fluid from a first pressure source 272 to first fluid cavity 228. First return pilot valve 270 is operable to control a flow of fluid from first fluid cavity 228 to a first reservoir 274.

First supply pilot valve 268 of actuator 186 may be fluidly connected to first pressure source 272 through a first supply passage 276, and to first fluid cavity 228 through a second supply passage 278. First return pilot valve 270 may be fluidly connected to first fluid cavity 228 through a first return passage 280, and to first reservoir 274 through a second return passage 282. The pressure within first fluid cavity 228 may be selectively increased by transferring fluid from first pressure source 272 to first fluid cavity 228 through first supply pilot valve 268, and may be selectively decreased by transferring fluid from first fluid cavity 228 to first reservoir 274 through first return pilot valve 270. Pressurizing first fluid cavity 228 causes a force to be exerted against armature 210 that tends to move spool 64 in a generally axial direction relative to valve body 22 and away from end wall 236 of housing 204.

The pressure within second fluid cavity 232 of second actuator 186 may be at least partially controlled by means of a second supply pilot valve 284, and a second return pilot valve 286. Supply pilot valve 284 and return pilot valve 286 may be electromagnetically actuated, for example, by a solenoid valve, or may be pneumatically or hydraulically actuated. In the exemplary configuration shown in FIGS. 5 and 6, pilot valves 284 and 285 are electromagnetically actuated. Although shown as two separate pilot valves 284 and 286, the pilot valves may also be configured as a single pilot valve. Second supply pilot valve 284 is operable to control a flow of fluid from a second pressure source 288 to second fluid cavity 232. Second return pilot valve 286 is operable to control a flow of fluid from second fluid cavity 232 to a second reservoir 290. Second supply pilot valve 284 may be fluidly connected to second pressure source 288 through a third supply passage 292, and to second fluid cavity 232 through a fourth supply passage 294. Second return pilot valve 286 may be fluidly connected to second fluid cavity 232 through a third return passage 296, and to second reservoir 290 through a fourth return passage 298. The pressure within second fluid cavity 232 may be selectively increased by transferring fluid from second pressure source 288 to second fluid cavity 232 through second supply pilot valve 284, and may be selectively decreased by transferring fluid from second fluid cavity 232 to second reservoir 290 through second return pilot valve 286. Pressurizing second fluid cavity 232 causes a force to be exerted against armature 210 that tends to move spool 64 in a generally axially direction relative to valve body 22 and toward end wall 236 of housing 204.

Valve 20 may also employ first return spring 118 for biasing sleeve 42 toward first actuator 184, and second return spring 120 for biasing spool 64 toward second actuator 186. First return spring 118 exerts a biasing force against sleeve 42 that is opposite the force produced by first actuator 184. Similarly, second return spring 120 exerts a biasing force against spool 64 that is opposite the force produced by second actuator 186. Return springs 118 and 120 urge sleeve 42 and spool 64 toward the second fully open position, as shown in FIG. 2B. Since first and second actuators 184 and 186 include second fluid cavities 220 and 232 that may be pressurized to urge sleeve 42 and spool 64 toward the second fully open position (as shown in FIG. 2B), return springs 118 and 120 may generally operate to provide a biasing force for moving spool 64 and sleeve 42 to the second fully open position when first actuator 184 and second actuator 186 are not actively controlling the operation of sleeve 42 and spool 64, which may occur for example, when shutting down the hydraulic system or as a result of a loss of power or component malfunction. Return springs 118 and 120 may be eliminated when employing second fluid cavities 220 and 232 if it is not necessary or desirable that spool 64 and sleeve 42 be returned to the second fully open position when valve 20 is not being actively controlled. Depending on the design requirements of the particular application, it may desirable to eliminated second fluid cavities 220 and 232, and the associated hydraulic hardware, including second supply pilot valves 252 and 284, and second return pilot valves 254 and 286, in which case return springs 118 and 120 would perform generally the same function and operate in the same general manner as described above with respect to the valve configurations shown in FIGS. 3-6.

Although separate pressure sources 242, 256, 272 and 288 are described for providing pressurized fluid to fluid cavities 216, 220, 228 and 232, respectively, it may also be possible to combine two or more of the pressure sources into a single pressure source. For example, all four pressure sources may be combined into a single pressure source, or pressure sources 242 and 256 may be combined into a single pressure source, and pressure sources 272 and 288 may be combined into a single pressure source. Likewise, although separate reservoirs 243, 258, 274 and 290 are described, in practice, a single reservoir will generally be employed. It may also be possible, however, to combine two or more of the reservoirs into a single reservoir. For example, reservoirs 243 and 254 may be combined into a single reservoir, and reservoirs 274 and 290 may be combined into a single reservoir. Other combinations of pressure sources and reservoirs are also possible.

First and second hybrid electromechanical/hydro-mechanical actuators 184 and 186 are operable to selectively position spool 64 and sleeve 42 at an infinite number of locations, between and including, the first fully open position (as shown in FIGS. 2A and 8) and the second fully open position (as shown in FIG. 2B). Spool 64 and sleeve 42 may be positioned in a desired position by selectively varying the current applied to coil 194 of first actuator 184 and coil 206 of second actuator 186, and by varying the pressure within first and second fluid cavities 216 and 220 of first actuator 184, and first and second fluid cavities 228 and 232 of second actuator 186. Sleeve 42 will generally be positioned at a location in which the force produced by first solenoid 188, first return spring 118, and the pressure within first and second fluid cavities 216 and 220 of first actuator 184, are substantially balanced. Similarly, spool 64 will generally be positioned at a location in which the force produced by second solenoid 190, second return spring 120, and the pressure within first and second fluid cavities 228 and 232 of second actuator 186, are substantially balanced. For example, sleeve 42 and spool 64 may be positioned in the closed position, as shown in FIGS. 1 and 7, by increasing the current applied to the respective coils beyond what is required to maintain the spool and sleeve in the second fully open position (as shown in FIG. 2B). Increasing the current further moves spool 64 and sleeve 42 from the closed position (FIGS. 1 and 7) to the first fully open position (FIGS. 2A and 8). Spool 64 and sleeve 42 may also be positioned in the closed position, as shown in FIGS. 1 and 5, by increasing the pressure within fluid cavities 216 and 228 beyond that which is required to maintain the spool and sleeve in the second fully open position (as shown in FIG. 2B). Increasing the pressure within fluid cavities 216 and 228 further tends to move spool 64 and sleeve 42 from the closed position, as shown in FIG. 7, to the first fully open position, as shown in FIG. 8. Thus, the flow through ports 28, 30 and 32 of valve 20 may be controlled by selectively varying the current applied to coil 194 of first actuator 184 and coil 206 of second actuator 186, and the pressure within first and second fluid cavities 216 and 220 of first actuator 184, and first and second fluid cavities 228 and 232 of second actuator 186. The two actuating mechanisms may be used in conjunction with one another, or individually, to obtain precise positioning the sleeve and spool. For example, hydro-mechanical actuation may be used to quickly position the spool and sleeve in a general vicinity of a desired position, and electromagnetic actuation may be used to finely tune to the position of the sleeve and spool. The two actuating mechanisms may be operated simultaneously, sequentially, or individually.

Referring also to FIGS. 9 and 10, valve 20 may employ a first combination electromechanical and hydro-mechanical actuator 300 for selectively operating sleeve 42, and a second combination electromechanical and hydro-mechanical actuator 302 for selectively operating spool 64. Combination electromechanical and hydro-mechanical actuators 300 and 302 generally combine the features of electromagnetic actuators 82 and 84 (as shown in FIGS. 3 and 4), with the features of hydro-mechanical actuators 124 and 126 (as shown in FIGS. 5 and 6). For purposes of discussion, the two actuators are described as having the same general configuration. It is not necessary, however, that both actuators be identically configured, or even similarly configured. Further, as will be discussed in more detail subsequently, it is not necessary that both actuators be of the same type. In practice, the type and configuration of the actuators employed may depend, at least in part, on the design and performance requirements of the particular application.

First actuator 300 may each include a first housing 304, and second actuator 302 may include a second housing 306. Slidably disposed within first housing 304 is a first piston 308, and slidably disposed within second housing 306 is a second piston 310. Pistons 308 and 310 may assume an infinite number of controlled positions within their respective working ranges. First piston 308 may be attached to an actuating rod 312. An end 314 of actuating rod 312 engages end 102 of sleeve 42. Actuating rod 312 of first actuator 300 may be releasably attached to, fixedly attached to, or integrally formed with sleeve 42. Similarly, second piston 310 may be attached to an actuating rod 316. An end 318 of actuating rod 316 engages end 116 of spool 64. Actuating rod 316 of second actuator 302 may be releasably attached to, fixedly attached to, or integrally formed with spool 64.

Piston 308 of first actuator 300 and housing 304 at least partially define a fluid cavity 320 for receiving a pressurized fluid. The pressurized fluid generates a force against piston 308 for urging the piston away from an end wall 322 of housing 304. Actuating rod 312 attached to piston 308 transmits the force to sleeve 42. Similarly, piston 310 of second actuator 302 and housing 306 at least partially define a fluid cavity 324 for receiving a pressurized fluid. The pressurized fluid generates a force against piston 310 for urging the piston away from an end wall 326 of housing 306. Actuating rod 316 attached to piston 310 transmits the force to spool 64. The position of pistons 308 and 310 may be controlled, by varying the pressure within fluid cavities 320 and 324. The pressure within fluid cavity 320 determines the amount of force transferred to sleeve 42, and the pressure within fluid cavity 324 determines the amount of force transferred to spool 64. Varying the pressure applied to pistons 308 and 310 adjusts the movement of the corresponding spool and sleeve to vary the flow through valve 20.

The pressure within fluid cavity 320 of first actuator 300 may be controlled by means of a first supply pilot valve 328 and a return pilot valve 330. Supply pilot valve 328 and return pilot valve 330 may be electromagnetically actuated, for example, by a solenoid valve, or may be pneumatically or hydraulically actuated. In the exemplary configuration shown in FIGS. 5 and 6, pilot valves 328 and 330 are electromagnetically actuated. Supply pilot valve 320 may be fluidly connected to a pressure source 332 through a first supply passage 334, and to fluid cavity 320 through a second supply passage 336. Return pilot valve 330 may be fluidly connected to fluid cavity 320 through a first return passage 338, and to a reservoir 340 through a second return passage 342. The pressure within fluid cavity 320 may be selectively increased by transferring fluid from pressure source 332 to fluid cavity 320 through supply pilot valve 328, and may be selectively decreased by transferring fluid from fluid cavity 320 to reservoir 340 through return pilot valve 330. Pressurizing fluid cavity 320 causes a force to be exerted against piston 308 that tends to move sleeve 42 in a generally axial direction relative to valve body 22 and away from end wall 322 of housing 304.

The pressure within fluid cavity 324 of second actuator 302 may be controlled by means of a first supply pilot valve 344 and a return pilot valve 346. Supply pilot valve 344 and return pilot valve 346 may be electromagnetically actuated, for example, by a solenoid valve, or may be pneumatically or hydraulically actuated. In the exemplary configuration shown in FIGS. 5 and 6, pilot valves 344 and 346 are electromagnetically actuated. Supply pilot valve 344 may be fluidly connected to a pressure source 348 through a first supply passage 350, and to fluid cavity 324 through a second supply passage 352. Return pilot valve 346 may be fluidly connected to fluid cavity 324 through a first return passage 354, and to a reservoir 356 through a second return passage 358. The pressure within fluid cavity 324 may be selectively increased by transferring fluid from pressure source 348 to fluid cavity 324 through supply pilot valve 344, and may be selectively decreased by transferring fluid from fluid cavity 324 to reservoir 356 through return pilot valve 346. Pressurizing fluid cavity 324 causes a force to be exerted against piston 310 that tends to move spool 64 in a generally axial direction relative to valve body 22 and away from end wall 326 of housing 306.

First actuator 300 may also include a first proportional solenoid 360, and second actuator 302 may include a second proportional solenoid 362. Solenoids 360 and 362 may each assume an infinite number of controlled positions within their respective working ranges. First solenoid 360 may include a solenoid housing 364 that may be connected to hydro-mechanical housing 304. Disposed within housing 364 is a generally cylindrically-shaped coil 366 consisting of a coiled wire 368. The ends of wire 368 may be electrically attached to an electrical power source for supplying a current to the coil. Moveably disposed within coil 366 is an armature 370 made of a magnetic material. Armature 370 may be attached to actuating rod 312 that is attached to piston 308.

Second solenoid 362 may include a solenoid housing 372 that may be connected to hydro-mechanical housing 306. Disposed within housing 372 is a generally cylindrically-shaped coil 374 consisting of a coiled wire 376. The ends of wire 376 may be electrically attached to an electrical power source for supplying a current to the coil. Moveably disposed within coil 374 is an armature 378 made of a magnetic material. Armature 378 may be attached to actuating rod 316 that is attached to piston 310.

Solenoid 360 may be energized to generate an electromagnetic force that acts upon armature 370 by passing current through coil 366. Solenoid 362 may be energized to generate an electromagnetic force that acts upon armature 378 by passing current through coil 374. Actuating rod 312 attached to armature 370 transmits the force to sleeve 42, and actuating rod 316 attached to armature 378 transmits the force to spool 64. The position of the solenoids may be at least partially controlled by varying the input current to the respective coils. The current level of the electrical signal applied to the respective coil at least partially determines the amount of force transferred to sleeve 42 and spool 64. Varying the current applied to coil 366 of solenoid 360, and coil 374 of solenoid 362, adjusts the movement of the corresponding spool and sleeve to vary the flow through valve 20.

Valve 20 may also employ first return spring 118 for biasing sleeve 42 toward first actuator 300, and second return spring 120 for biasing spool 64 toward second actuator 302. First return spring 118 exerts a biasing force against sleeve 42 that is opposite the force produced by first actuator 300. Similarly, second return spring 120 exerts a biasing force against spool 64 that is opposite the force produced by second actuator 302. Return springs 118 and 120 urge sleeve 42 and spool 64, respectively, toward the second fully open position, as shown in FIG. 2B. Sleeve 42 may be moved in a direction away from the second fully open position (as shown in FIG. 2B) and toward the first fully open position (as shown in FIG. 2A) by pressurizing fluid cavity 312 of first actuator 300 to exert a force against piston 308 and actuating rod 312, and/or, by applying a current to coil 366 of first solenoid 360 to cause the solenoid to exert a force on actuating rod 312, which combined force is sufficient to overcome the biasing force of first return spring. The force produced by first actuator 300 tends to move sleeve 42 in a direction away from first actuator 300 until a balance is achieved between the force generated by first actuator 300 and the biasing force produced by return spring 118. Likewise, spool 64 may be moved in a direction away from the second fully open position (as shown in FIG. 2B) and toward the first fully open position (as shown in FIG. 2A) by pressurizing fluid cavity 324 of second actuator 302 to exert a force against piston 310 and shaft 316, and/or, by applying a current to coil 374 of solenoid 362 to cause the solenoid to exert a force on actuating rod 316, which combined force is sufficient to overcome the biasing force of second return spring 120. The force produced by second actuator 302 tends to move spool 64 in a direction away from second actuator 302 until a balance is achieved between the force generated second actuator 302 and the biasing force produced by second return spring 120. Thus, the flow through ports 28, 30 and 32 of valve 20 may be controlled by selectively varying the pressure within fluid cavities 320 and 324, and/or selectively varying the current applied to coils 366 and 374.

Although two separate pressure sources 332 and 348 are described for providing pressurized fluid to fluid cavities 320 and 324, respectively, the pressurized fluid may be provided from a single source. Likewise, although two separate reservoirs 340 and 356 are described, in practice, a single reservoir may be employed.

Combination electromechanical and hydro-mechanical actuators 300 and 302 are operable to selectively position spool 64 and sleeve 42 at an infinite number of locations, between and including, the first fully open position (as shown in FIGS. 2A and 10) and the second fully open position (as shown in FIG. 2B). Spool 64 and sleeve 42 may be positioned in a desired position by selectively varying the current applied to coil 366 of first actuator 300 and coil 374 of second actuator 302, and by varying the pressure within fluid cavities 320 and 324 of actuators 300 and 302. Sleeve 42 will generally be positioned at a location in which the force produced by solenoid 360, return spring 118, and the pressure within fluid cavity 320, are substantially balanced. For example, sleeve 42 may be positioned in the closed position, as shown in FIGS. 1 and 9, by increasing the current applied to coil 366 beyond what is required to maintain the sleeve in the second fully open position (as shown in FIG. 2B). Increasing the current further tends to move sleeve 42 from the closed position (FIGS. 1 and 9) to the first fully open position, as shown in FIGS. 2A and 10. Similarly, spool 64 will generally be positioned at a location in which the force produced by solenoid 362, return spring 120, and the pressure within fluid cavity 324, are substantially balanced. For example, spool 64 may be positioned in the closed position, as shown in FIGS. 1 and 9, by increasing the current applied to coil 374 beyond what is required to maintain the spool in the second fully open position (as shown in FIG. 2B). Increasing the current further tends to move spool 64 from the closed position (FIGS. 1 and 9) to the first fully open position, as shown in FIGS. 2A and 10. Thus, the flow through ports 28, 30 and 32 of valve 20 may be controlled by selectively varying the current applied to coils 366 and 374, and/or the pressure within fluid cavities 320 and 324.

Sleeve 42 and spool 64 may be moved in any desired order, sequence or pattern. By way of example and without limitation, spool 64 and sleeve 42 may be moved substantially simultaneously or concurrently. This will generally produce the fastest valve response times. Spool 64 and sleeve 42 may also be move sequentially in any order, which will generally result in longer response times than if the two members are operated simultaneously. The actuating sequence of spool 64 and sleeve 42 may also partially overlap. This may occur, for example, when one of the members is actuated after the other member, but before the actuating sequence of the other member is completed. Other spool and sleeve operating sequences are also possible.

Examples of the various types of actuators that may be employed for controlling the operation of sleeve 42 and spool 64 are illustrated in FIGS. 3-10. The various types of actuators include, but are not limited to, an electromagnetic actuator 82,84 (as shown in FIGS. 3 and 4); a hydro-mechanical actuator 124,126 (as shown in FIGS. 5 and 6); a hybrid electromagnetic/hydro-mechanical actuator 184,186 (as shown in FIGS. 7 and 8); and a combination electromagnetic and hydro-mechanical actuator 300,302 (as shown in FIGS. 9 and 10). For purposes of discussion, the same actuator type is shown being used to operate both sleeve 42 and spool 64. It is not necessary, however, that the same actuator type be used to operate sleeve 42 and spool 64. For example, electromagnetic actuator 82 (see FIGS. 3 and 4) may be employed for operating sleeve 42, whereas hydro-mechanical actuator 126 (see FIGS. 5 and 6) may be employed within the same valve 20 for operating spool 64. Further, there may be instances in which either sleeve 42 or spool 64 is held stationary with respect to valve body 22.

Exemplary illustrations of various actuator combinations that may be employed within a given valve are listed in the table in FIG. 11. A total of twenty valve configurations are identified. The first column assigns an arbitrary number to the particular configuration. The second column identifies the type of actuator employed for operating spool 64. The third column identifies the type of actuator employed for operating sleeve 42. Valve configuration 1 corresponds to the configuration shown in FIGS. 3 and 4, in which an electromagnetic actuator is employed for operating both sleeve 42 and spool 64. Valve configuration 6 corresponds to the configuration shown in FIGS. 5 and 6, in which a hydro-mechanical actuator is employed for operating both sleeve 42 and spool 64. Valve configuration 12 corresponds to the configuration shown in FIGS. 7 and 8, in which a hybrid electromagnetic/hydro-mechanical actuator is employed for operating both sleeve 42 and spool 64. Valve configuration 18 corresponds to the configuration shown in FIGS. 9 and 10, in which a combination electromagnetic and hydro-mechanical actuator is employed for operating both sleeve 42 and spool 64. The remaining valve configurations identified in the table in FIG. 11 describe various additional actuator combinations that may be employed for operating sleeve 42 and valve 64.

Figure 12:
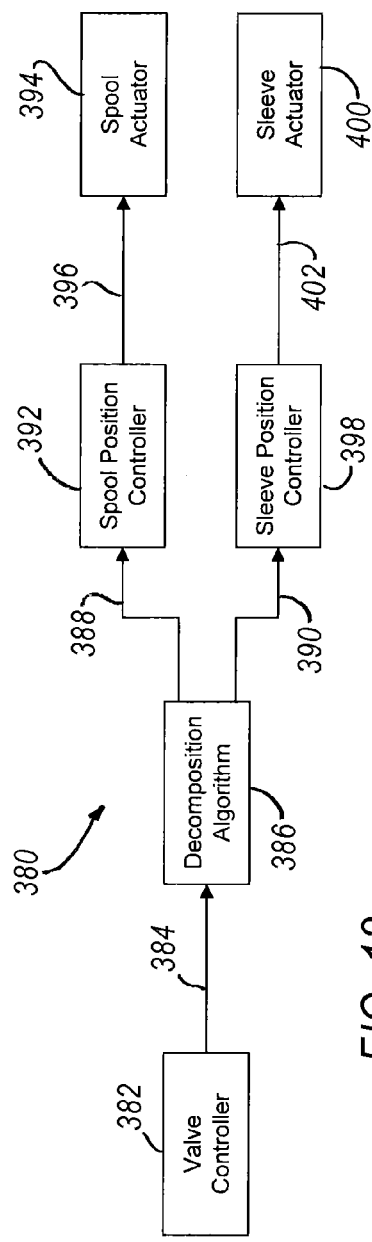
FIG. 12 illustrates an exemplary open loop control strategy for controlling operation of the spool and sleeve of the proportional valve.
Figure 13:
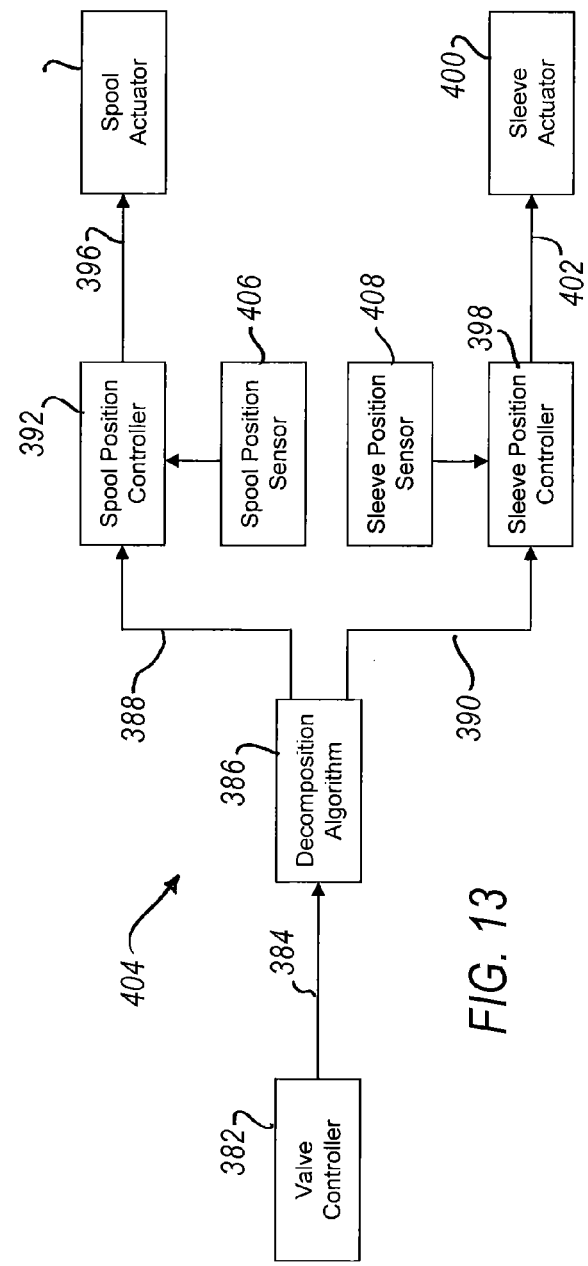
FIG. 13 illustrates an exemplary closed loop control strategy for controlling operation of the spool and sleeve of the proportional valve.
Figure 14:
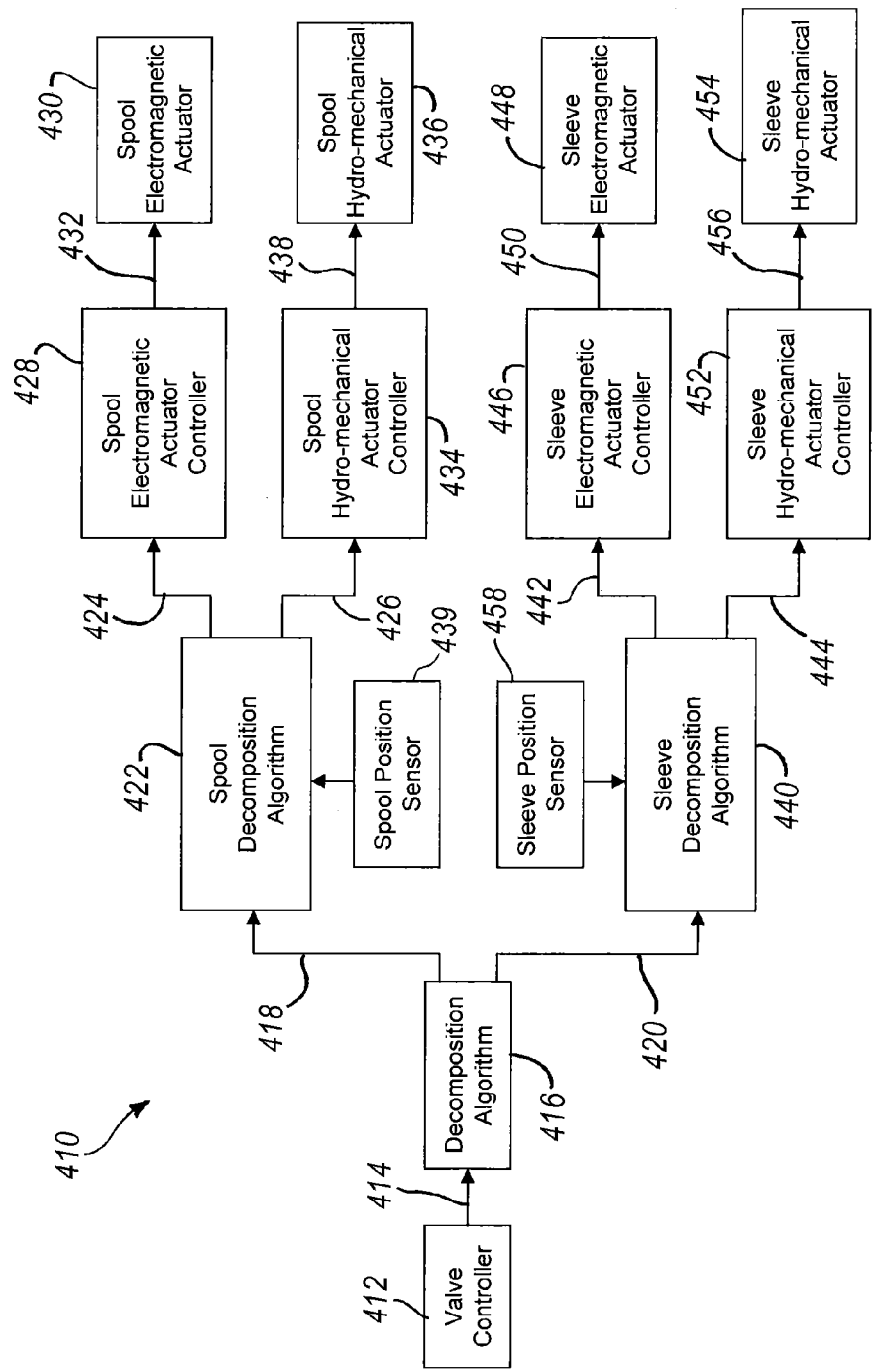
FIG. 14 illustrates an exemplary closed loop control strategy for controlling operation of the proportional valve employing a hybrid electromagnetic/hydro-mechanical actuator or a combined electromagnetic and hydro-mechanical actuator.

Referring to FIGS. 12-14, various exemplary control strategies for controlling operation of valve 20 are illustrated. FIGS. 12 and 13, respectively, illustrate exemplary open-loop and closed-loop control strategies that may be used with valve configurations employing actuators having a single type of actuator for moving each of spool 64 and sleeve 42, such as shown for example, in FIGS. 3-6. The exemplary closed-loop control strategy illustrated in FIG. 14 may be employed with valve configurations that use a combination of actuator types to move each of spool 64 and sleeve 42, such as shown, for example, in FIGS. 9 and 10, and valve configurations employing hybrid type actuators for moving the spool and sleeve, such as shown for example, in FIGS. 7 and 8.

FIG. 12 illustrates an open-loop valve control strategy 380 that may be employed to control operation of electromagnetic actuators 82 and 84, as shown in FIGS. 3 and 4, and hydro-mechanical actuators 124 and 126, as shown in FIGS. 5 and 6. As previously discussed, electromagnetic actuator 82 (FIGS. 3 and 4) and hydro-mechanical actuator 124 (FIGS. 5 and 6) control the operation of sleeve 42. Electromagnetic actuator 84 (FIGS. 3 and 4) and hydro-mechanical actuator 126 (FIGS. 5 and 6) control the operation of spool 64. Although valve control strategy 380 is described in connection with electromagnetic and hydro-mechanical type actuators, valve control strategy 380 may also be used to control valves employing other types of actuators.

Valve control strategy 380 may be at least partially implemented through a valve controller 382 that may be provided for controlling the operation of valve 20. Valve controller 382 may include for example, a microprocessor, a central processing unit (CPU), and a digital controller, among others. Valve controller 382 may be configured to control operation of valve 20 in response to various system inputs. For example, valve controller 382 may generate a valve control signal 384 specifying a desired fluid connection between first port 28, second port 30 and third port 32, of valve 20, along with a corresponding orifice flow area that will provide the flow and pressure requirements of the hydraulic loads connected to valve 20. Factors that may be considered in determining the appropriate valve control signal may include the flow and pressure requirements of the hydraulic loads controlled by valve 20, the flow output of the pump used to supply pressurized fluid to the hydraulic loads, the discharge pressure of the pump, and the operating speed of pump.

Information transmitted via valve control signal 384 from valve controller 382 may be input into a decomposition algorithm 386 configured to determine the relative positions of spool 64 and sleeve 42 to achieve the flow and pressure requirements specified by valve control signal 384. Decomposition algorithm 384 may generate a spool control signal 388 defining an axial position of spool 64 relative to valve body 22, and a sleeve control signal 390 defining an axial position of sleeve 42 relative to valve body 22.

Spool control signal 388 may be input into a spool position controller 392 operably connected to a spool actuator 394. Spool actuator 394 represents generically the various types of actuators that may be used to operate spool 64. For example, spool actuator 394 may correspond to electromagnetic actuator 84 (FIGS. 3 and 4) when employing a solenoid type electromagnetic actuator to move spool 64. Spool actuator 394 may correspond to hydro-mechanical actuator 126 (FIGS. 5 and 6) when employing a hydro-mechanical type actuator to move spool 64.

Spool position controller 392 generates a signal 396 based, at least in part, on spool control signal 388 received from decomposition algorithm 386, and the configuration of spool actuator 394. For example, if spool actuator 394 consists of an electromagnetic actuator, such as electromagnetic actuator 84 (FIGS. 3 and 4), signal 396 may consist of an electrical signal. When employing a hydro-mechanical actuator to operate spool 64, such as hydro-mechanical actuator 126 (FIGS. 5 and 6), signal 396 may consist of an electrical signal if pilot valves 168 and 170 are electromagnetically actuated, and may consist of a pressure signal if the pilot valves are pneumatically or hydraulically actuated.

Sleeve control signal 390 may be input into a sleeve position controller 398 operably connected to a sleeve actuator 400. Sleeve actuator 400 represents generically the various types of actuators that may be used to operate sleeve 42. For example, sleeve actuator 400 may correspond to electromagnetic actuator 82 (FIGS. 3 and 4) when employing a solenoid type actuator to move sleeve 42. Sleeve actuator 400 may correspond to hydro-mechanical actuator 124 (FIGS. 5 and 6) when employing a hydro-mechanical type actuator to move sleeve 42.

Sleeve position controller 398 may generate a signal 402 based, at least in part, on sleeve control signal 390 and the configuration of sleeve actuator 400. For example, if sleeve actuator 400 consists of an electromagnetic actuator, such as electromagnetic actuator 82 (FIGS. 3 and 4), signal 402 may consist of an electrical signal. When employing a hydro-mechanical actuator to operate sleeve 42, such as hydro-mechanical actuator 124 (FIGS. 5 and 6), control signal 402 may consist of an electrical signal if pilot valves 152 and 154 (FIGS. 5 and 6) are electromagnetically actuated, and may consist of a pressure signal if the pilot valves are pneumatically or hydraulically actuated.

FIG. 13 illustrates a closed-loop valve control strategy 404 that may be employed to control operation of electromagnetic actuators 82 and 84, as shown in FIGS. 3 and 4, and hydro-mechanical actuators 124 and 126, as shown in FIGS. 5 and 6. Valve control strategy 404 is similar to control strategy 380 (FIG. 12), with the exception that spool position controller 392 may receive feedback from a spool position sensor 406, and sleeve position controller 398 may receive feedback from a sleeve position sensor 408. Spool position sensor 406 and sleeve position sensor 408 monitor the positions, respectively, of spool 64 and sleeve 42. Spool position controller 392 may use the information received from spool position sensor 406 to adjust, if necessary, signal 396 used to position spool 64 at a desired location. Similarly, sleeve position controller 398 may use the information received from sleeve position sensor 408 to adjust, if necessary, signal 402 used to position sleeve 42 at a desired location.

FIG. 14 illustrates an exemplary closed-loop control strategy 410 that may be used for controlling operation of valve 20 when employing a combination of actuator types to move each of spool 64 and sleeve 42, such as shown, for example, in FIGS. 9 and 10, and valve configurations employing hybrid type actuators for moving the spool and sleeve, such as shown, for example, in FIGS. 7 and 8. Valve control strategy 410 may be at least partially implemented through a valve controller 412 that may be provided for controlling the operation of valve 20. Valve controller 412 may include for example, a microprocessor, a central processing unit (CPU), and a digital controller, among others. Valve controller 412 may be configured to control operation of valve 20 in response to various system inputs. Valve controller 412 may generate a valve control signal 414 specifying a desired fluid connection between first port 28, second port 30 and third port 32, of valve 20, along with a corresponding orifice flow area that will provide the flow and pressure requirements of the hydraulic loads connected to valve 20. Factors that may be considered in determining the appropriate valve control signal 414 may include the flow and pressure requirements of the hydraulic loads controlled by valve 20, the flow output of the pump used to supply pressurized fluid to the hydraulic loads, the discharge pressure of the pump, and the operating speed of pump.

Information transmitted via valve control signal 414 from valve controller 412 may be input into a decomposition algorithm 416 configured to determine the relative positions of spool 64 and sleeve 42 to achieve the flow and pressure requirements specified by valve control signal 414. Decomposition algorithm 416 may generate a spool control signal 418 defining an axial position of spool 64 relative to valve body 22, and a sleeve control signal 420 defining an axial position of sleeve 42 relative to valve body 22. Since, generally speaking, two actuators are used to control movement of spool 64, spool control signal 418 may be input into a spool decomposition algorithm 422, which may be configured to formulate two signals based on the type of actuator being employed. For example, FIGS. 7 and 8 illustrate an exemplary valve configuration employing hybrid electromagnetic/hydro-mechanical actuator 186 to operate spool 64. Spool decomposition algorithm 422 may generate a spool electromagnetic actuator control signal 424 for controlling the operation of proportional solenoid 190, and a spool hydro-mechanical actuator control signal 426 for controlling the operation of pilot valves 268, 270, 284 and 286. When using a combination of electromagnetic and hydro-mechanical actuators to operate spool 64, for example, as shown in FIGS. 9 and 10, spool electromagnetic actuator control signal 424 may be configured to control the operation of solenoid 362, and a spool hydro-mechanical actuator control signal 426 may be configured to control the operation of pilot valves 344 and 346.

Spool electromagnetic actuator control signal 424 may be input into a spool electromagnetic actuator controller 428 operably connected to a spool electromagnetic actuator 430. Spool electromagnetic actuator 430 may correspond to proportion solenoid 190, as shown in FIGS. 7 and 8, and solenoid 362, as shown in FIGS. 9 and 10. Spool electromagnetic actuator controller 428 may generate an electrical signal 432 for operating electromagnetic actuator 430.

Spool hydro-mechanical actuator control signal 426 may be input into a spool hydro-mechanical actuator controller 434 operably connected to a spool hydro-mechanical actuator 436. Spool hydro-mechanical actuator 436 may correspond to pilot valve 268, 270, 284 and 286 used for controlling the selective pressurization of fluid cavities 228 and 232, as shown in FIGS. 7 and 8, and pilot valves 344 and 346 for selectively pressurizing fluid cavity 324, as shown in FIGS. 9 and 10. Spool hydro-mechanical actuator controller 434 may generate a signal 438 for operating hydro-mechanical actuator 436. Signal 438 may consist of a pressure signal if the pilot valves are pneumatically or hydraulically actuated, or an electrical signal if the pilot valves are electrically actuated.

Valve control strategy 410 may employ a closed-loop scheme for controlling the operation of spool electromagnetic actuator 430 and spool hydro-magnetic actuator 436. Spool decomposition algorithm 422 may receive feedback from a spool position sensor 439, which monitors the position of spool 64. Spool decomposition algorithm 422 may use the information received from spool position sensor 439 to adjust, if necessary, spool electromagnetic actuator control signal 424 used to position spool 64 at a desired location.

Continuing to refer to FIG. 14, since, generally speaking, two actuators are used to control movement of sleeve 42, sleeve control signal 420 may be input into a sleeve decomposition algorithm 440, which may be configured to formulate two signals based on the type of actuator being employed. For example, FIGS. 7 and 8 illustrate an exemplary valve configuration employing hybrid electromagnetic/hydro-mechanical actuator 184 to operate sleeve 42. Sleeve decomposition algorithm 440 may generate a sleeve electromagnetic actuator control signal 442 for controlling the operation of proportional solenoid 188, and a sleeve hydro-mechanical actuator control signal 444 for controlling the operation of pilot valves 238, 240, 252 and 254. When using a combination of electromagnetic and hydro-mechanical actuators to operate sleeve 42, for example, as shown in FIGS. 9 and 10, sleeve electromagnetic actuator control signal 442 may be configured to control the operation of solenoid 360, and a spool hydro-mechanical actuator control signal 444 may be configured to control the operation of pilot valves 328 and 330.

Sleeve electromagnetic actuator control signal 442 may be input into a sleeve electromagnetic actuator controller 446 operably connected to a sleeve electromagnetic actuator 448. Sleeve electromagnetic actuator 448 may correspond to proportion solenoid 188, as shown in FIGS. 7 and 8, and solenoid 360, as shown in FIGS. 9 and 10. Sleeve electromagnetic actuator controller 446 may generate an electrical signal 450 for operating sleeve electromagnetic actuator 448.

Sleeve hydro-mechanical actuator control signal 444 may be input into a sleeve hydro-mechanical actuator controller 452 operably connected to a sleeve hydro-mechanical actuator 454. Sleeve hydro-mechanical actuator 454 may correspond to pilot valves 238, 240, 252 and 254 used for controlling the selective pressurization of fluid cavities 216 and 220, as shown in FIGS. 7 and 8, and pilot valves 328 and 330 for selectively pressurizing fluid cavity 320, as shown in FIGS. 9 and 10. Sleeve hydro-mechanical actuator controller 452 may generate a signal 456 for operating sleeve hydro-mechanical actuator 454. Signal 456 may consist of a pressure signal if the pilot valves are pneumatically or hydraulically actuated, or an electrical signal if the pilot valves are electrically actuated.

Valve control strategy 410 may employ a closed-loop scheme for controlling the operation of sleeve electromagnetic actuator 448 and sleeve hydro-magnetic actuator 454. Sleeve decomposition algorithm 440 may receive feedback from a sleeve position sensor 458, which monitors the position of sleeve 42. Sleeve decomposition algorithm 440 may use the information received from sleeve position sensor 458 to adjust, if necessary, sleeve electromagnetic actuator control signal 444 used to position sleeve 42 at a desired location.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A valve comprising:
   a first valve member including at least one orifice, the first valve member moveable between a first position and a second position;
   a first actuator operably connected to the first valve member, the first actuator being an electromagnetic actuator and operable for moving the first valve member between its first and second positions; and
   a second actuator operably connected to the first valve member, the second actuator is a hydro-mechanical actuator and is operable for moving the first valve member between its first and second positions;
   wherein the hydro-mechanical actuator and then the electromagnetic actuator are operated sequentially, with the hydro-mechanical actuator moving the first valve member to a vicinity of a desired position and the electromagnetic actuator moving the first valve member to the desired position.

2. The valve of claim 1 further comprising:
   a second valve member including at least one orifice, the second valve member moveable relative to the first valve member between a first position, in which the at least one orifice of the second valve member is fluidly disconnected from the at least one orifice of the first valve member, and a second position, in which the at least one orifice of the second valve member is fluidly connected to the at least one orifice of the first valve member; and
   a third actuator operably connected to the second valve member, the third actuator is an electromagnetic actuator and is operable for moving the second valve member between its first and second positions.

3. The valve of claim 2 further comprising a fourth actuator operably connected to the second valve member, the fourth actuator is a hydro-mechanical actuator and is operable for moving the second valve member between its first and second positions, wherein the first and second actuators move the first valve member in a direction substantially opposite a direction the third and fourth actuators move the second valve member.

4. The valve of claim 2, wherein the first, second and third actuators operate concurrently to move the first and second valve members between their respective first and second positions, and the first and second actuators move the first valve member in a direction substantially opposite a direction the third actuator moves the second valve member.

5. A valve comprising:
 a first valve member including at least one orifice, the first valve member moveable between a first position and a second position;
 a first actuator operably connected to the first valve member, the first actuator being an electromagnetic actuator and operable for moving the first valve member between its first and second positions; and
 a second actuator operably connected to the first actuator, the second actuator is a hydro-mechanical actuator and is operable for moving at least a portion of the first actuator operably connected to the first valve member between a first position and a second position;
 wherein the hydro-mechanical actuator and then the electromagnetic actuator are operated sequentially, with the hydro-mechanical actuator moving the first valve member to a vicinity of a desired position and the electromagnetic actuator moving the first valve member to the desired position.

6. The valve of claim 5 further comprising:
 a second valve member including at least one orifice, the second valve member moveable relative to the first valve member between a first position, in which the at least one orifice of the second valve member is fluidly disconnected from the at least one orifice of the first valve member, and a second position, in which the at least one orifice of the second valve member is fluidly connected to the at least one orifice of the first valve member; and
 a third actuator operably connected to the second valve member, the third actuator is an electromagnetic actuator and is operable for moving the second valve member between its first and second positions.

7. The valve of claim 6 further comprising a fourth actuator operably connected to the third actuator, the fourth actuator is a hydro-mechanical actuator and is operable for moving at least a portion of the third actuator operably connected to the second valve member between a first position and a second position.

8. The valve of claim 7, wherein the first and second actuators move the first valve member in a direction substantially opposite a direction the third and fourth actuators move the second valve member.

9. The valve of claim 6 further comprising a fourth actuator operably connected to the second valve member, the fourth actuator is a hydro-mechanical actuator and is operable for moving the second valve member between its first and second positions.

10. The valve of claim 6, wherein the first, second and third actuators operate at least substantially concurrently to move the first and second valve members between their respective first and second positions, and the first and second actuators move the first valve member in a direction substantially opposite a direction the third actuator moves the second valve member.

* * * * *